(12) United States Patent
Takahashi

(10) Patent No.: US 9,257,692 B2
(45) Date of Patent: Feb. 9, 2016

(54) FLAT-TYPE BATTERY

(75) Inventor: Kumiko Takahashi, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 78 days.

(21) Appl. No.: 13/643,657

(22) PCT Filed: Apr. 19, 2011

(86) PCT No.: PCT/JP2011/059640
§ 371 (c)(1),
(2), (4) Date: Oct. 26, 2012

(87) PCT Pub. No.: WO2011/136090
PCT Pub. Date: Nov. 3, 2011

(65) Prior Publication Data
US 2013/0045402 A1 Feb. 21, 2013

(30) Foreign Application Priority Data
Apr. 28, 2010 (JP) ................. 2010-103161

(51) Int. Cl.
*H01M 10/48* (2006.01)
*H01M 2/30* (2006.01)
*H01M 2/02* (2006.01)

(52) U.S. Cl.
CPC .............. *H01M 2/30* (2013.01); *H01M 2/0212* (2013.01)

(58) Field of Classification Search
None
See application file for complete search history.

(56) References Cited

U.S. PATENT DOCUMENTS

| 4,794,056 | A | 12/1988 | Pedicini | |
|---|---|---|---|---|
| 8,017,260 | B2 | 9/2011 | Kaneta et al. | |
| 2003/0054241 | A1 | 3/2003 | Yamashita et al. | |
| 2003/0113621 | A1* | 6/2003 | Shimamura et al. | 429/162 |
| 2005/0130037 | A1* | 6/2005 | Kaneta et al. | 429/178 |
| 2008/0060189 | A1* | 3/2008 | Daidoji et al. | 29/623.1 |
| 2009/0023062 | A1* | 1/2009 | Kim | 429/163 |
| 2010/0047687 | A1* | 2/2010 | Lee et al. | 429/185 |
| 2010/0173193 | A1* | 7/2010 | Kim | 429/178 |
| 2011/0256444 | A1 | 10/2011 | Kaneta et al. | |

FOREIGN PATENT DOCUMENTS

| EP | 1 770 801 A1 | 4/2007 |
|---|---|---|
| JP | 64-72455 A | 3/1989 |
| JP | 2003-162996 A | 6/2003 |

(Continued)

OTHER PUBLICATIONS

Supplementary European Search Report dated May 9, 2014, (7 pgs.).

*Primary Examiner* — Jose Colucci Rios
(74) *Attorney, Agent, or Firm* — Foley & Lardner LLP

(57) ABSTRACT

Disclosed is a flat battery which includes power generating element 18 accommodated in an inner space formed by sealing outer peripheral edges of package members 16 and 17, collector 11a, 13a connected to an electrode plate of power generating element 18 and an electrode tab 14, 15 taken out from the outer peripheral edges of package members 16 and 17. Electrode tab 14, 15 has conducting portion 151 overlapping and joined to collector 11a, 13a and stress relieving portion 152 formed of a material having higher elasticity than that of conducting portion 151. It is thus possible to prevent the occurrence of wrinkles in collector 11a, 13a or electrode tab 14, 15 and separations in weld joints due to a difference in expansion/contraction rate between collector 11a, 13a and electrode tab 14, 15.

12 Claims, 19 Drawing Sheets

(56) References Cited

FOREIGN PATENT DOCUMENTS

| | | |
|---|---|---|
| JP | 2003-317701 A | 11/2003 |
| JP | 2004-31097 A | 1/2004 |
| JP | 2004-31288 A | 1/2004 |
| JP | 2008-27892 A | 2/2008 |
| JP | 2009-545850 A | 12/2009 |

* cited by examiner

FLAT-TYPE BATTERY

FIELD OF THE INVENTION

The present invention relates to a flat battery.

BACKGROUND ART

A cylindrical battery is known in which an arc-shaped slit is formed in a circular conductive tab such that, even when a cover of the battery is swollen due to an increase in internal pressure, the tab can be bent at a center thereof by the slit without interfering with a plurality of weld joints (see Patent Document 1).

On the other hand, a thin battery (flat battery) is known in which positive and negative electrode tabs (electrode terminals) have one ends taken out of a laminate package of the battery and the other ends welded by ultrasonic welding to collectors of positive and negative electrode plates of a power generating element of the battery.

In the flat battery, however, there arises a difference in expansion/contraction rate between the electrode tab and the collectors when the electrode tab and the collectors are subjected to load or high temperature during the welding. This can cause wrinkles in the collectors and separations in the weld joints between the collectors and the electrode tab.

PRIOR ART DOCUMENTS

Patent Document

Patent Document 1: Japanese Laid-Open Patent Publication No. S64-72455

SUMMARY OF THE INVENTION

It is accordingly an object of the present invention to provide a flat battery capable of even when there occurs a relative deformation due to a difference in expansion/contraction rate between a collector and an electrode tab, following and allowing for such deformation.

Means for Solving the Problems

According to the present invention, there is provided a flat battery comprising: a conducting portion in which an electrode tab overlaps and is joined to a collector; and a stress relieving portion formed of a material having higher elasticity than that of the conducting portion.

In the present invention, the stress relieving portion is adapted to relieve deformation caused due to a difference in expansion/contraction rate between the collector and the electrode tab so that the flat battery can follow and allow for such relative deformation. It is therefore possible to prevent wrinkles in the collector and separation of the collector from the electrode tab.

DESCRIPTION OF EMBODIMENTS

Hereinafter, exemplary embodiments of the present invention will be described below with reference to the drawings.

Figure 1:
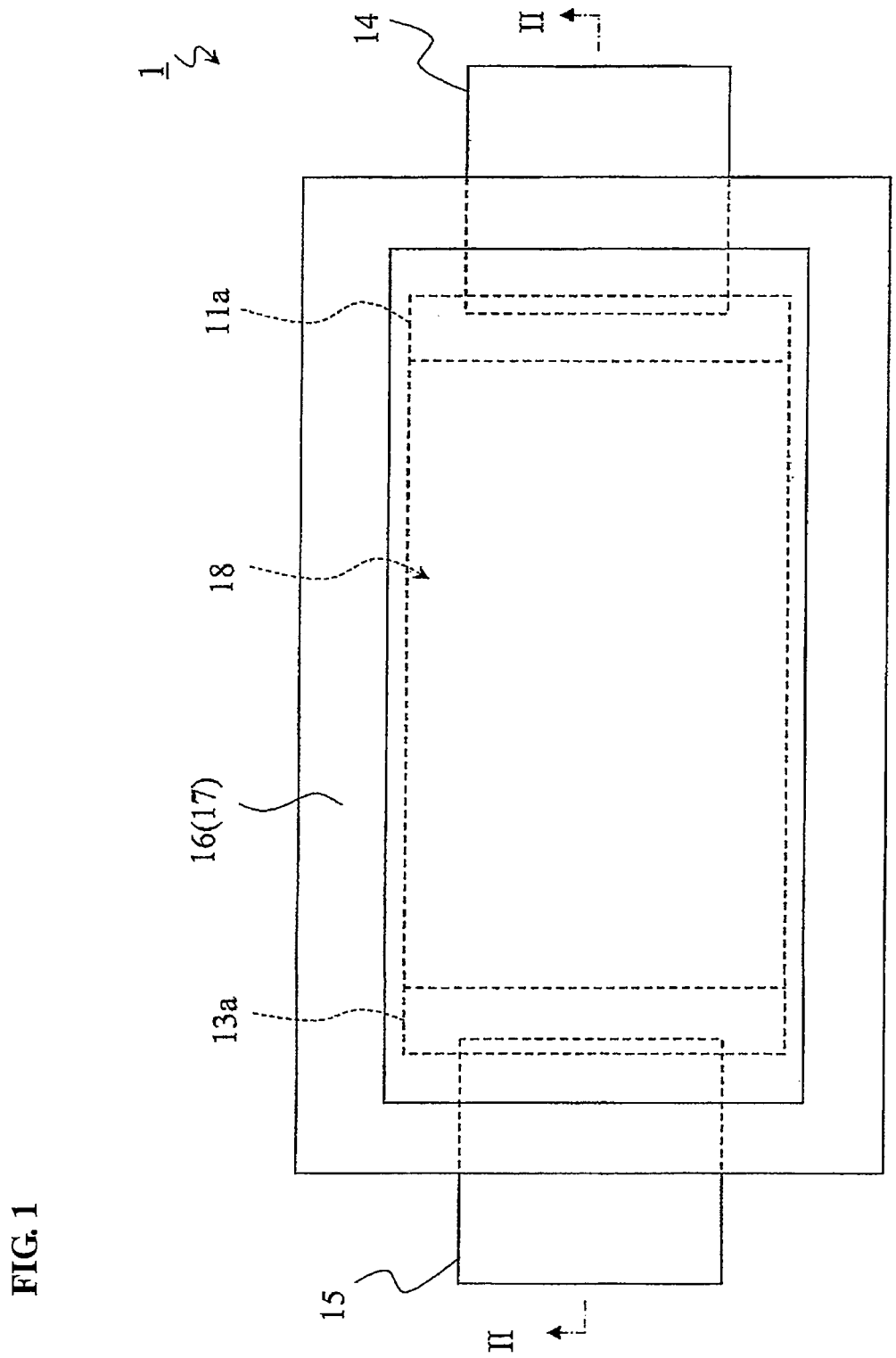
FIG. 1 is a plan view of a flat battery according to one exemplary embodiment of the present invention.
Figure 2:
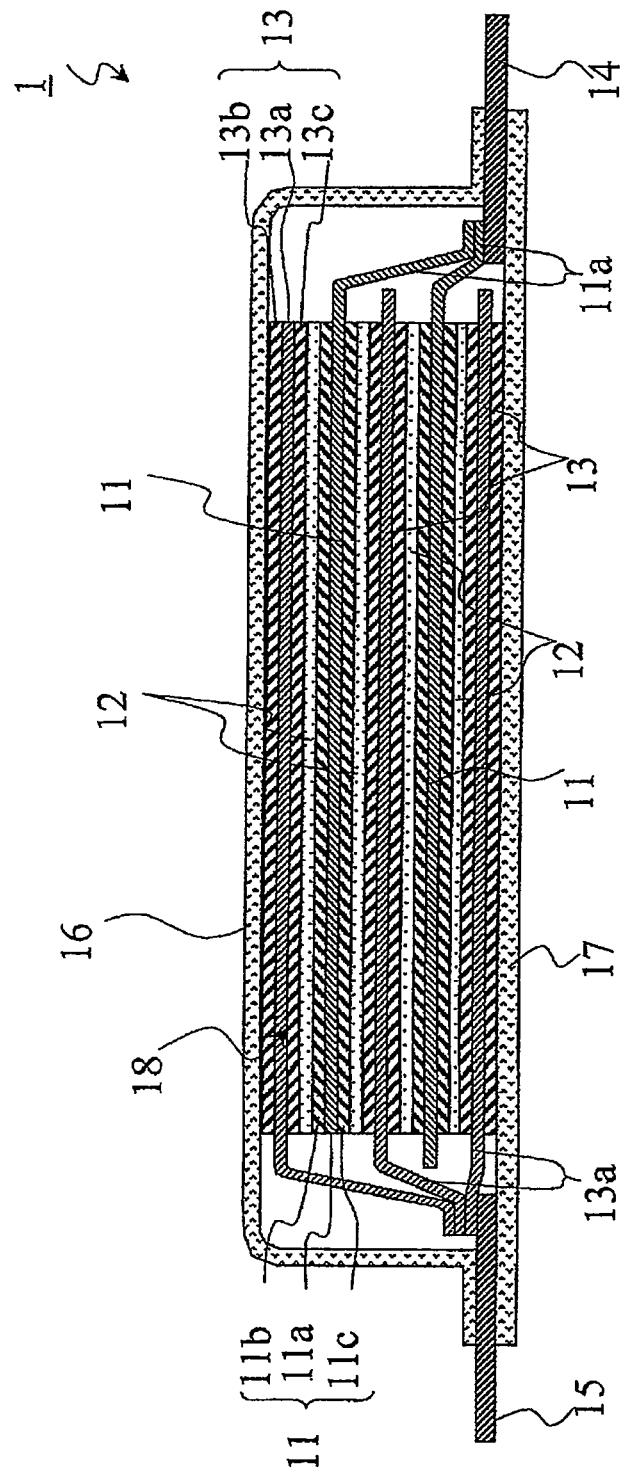
FIG. 2 is a cross-sectional view taken along line II-II of FIG. 1.

Flat battery 1 according to the present embodiment is designed as a plate-shaped thin-laminate-type lithium secondary battery. As shown in FIGS. 1 and 2, flat battery 1 includes two positive electrode plates 11, four separators 12, three negative electrode plates 13, positive electrode tab 14, negative electrode tab 15, upper package member 16, lower package member 17 and an electrolyte material although the electrolyte material is not specifically illustrated.

Among these component parts, positive electrode plates 11, separators 12, negative electrode plates 13 and the electrolyte material constitute power generating element 18. Further, positive and negative electrode plates 11 and 13 serve as electrode plates; and upper and lower package members 16 and 17 serve as a pair of package members.

Each of positive electrode plates 11 of power generating element 18 has positive electrode collector 11a extending to positive electrode tab 14 and positive electrode layers 11b and 11c formed on parts of opposite main surfaces of positive electrode collector 11a. Herein, positive electrode layers 11b and 11c of positive electrode plates 11 are not formed over the entire main surfaces of positive electrode collectors 11a but are formed only on the parts of the main surfaces of positive electrode collectors 11a on which positive electrode plates 11 substantially overlap separators 12 at the time positive electrode plates 11, separators 12 and negative electrode plates 12 are laminated and assembled into power generating element 18 as shown in FIG. 2. Although positive electrode collector 11a and positive electrode plate 11 are formed from one conductive material sheet in the present embodiment, positive electrode collector 11a and positive electrode plate 11 may be formed as separate component parts and joined to each other.

Positive electrode collectors 11a of positive electrode plates 11 are formed of for instance, electrochemically stable metal foil such as aluminum foil, aluminum alloy foil, copper foil or nickel foil. Positive electrode layers 11b and 11c of positive electrode plate 11 are formed by, for instance, mixing a positive electrode active material such as lithium composite oxide e.g. lithium nickelate ($LiNiO_2$), lithium manganate ($LiMnO_2$) or lithium cobaltate ($LiCoO_2$) or chalcogenide (compound of S, Se, Te etc.), a conductive agent such as carbon black, a binder such as aqueous dispersion medium of polypolytetrafluoroethylene and a solvent, applying the resulting mixture composition to the parts of the main surfaces of positive electrode collectors 11a and subjecting the applied mixture composition to drying and rolling.

Each of negative electrode plates 13 of power generating element 18 has negative electrode collector 13a extending to negative electrode tab 15 and negative electrode layers 13b and 13c formed on parts of opposite main surfaces of negative electrode collector 13a. Herein, negative electrode layers 13b and 13c of negative electrode plates 13 are not formed over the entire main surfaces of negative electrode collectors 13a but are formed only on the parts of the main surfaces of negative electrode collectors 13a on which negative electrode plates 13 substantially overlap separators 12 at the time positive electrode plates 11, separators 12 and negative electrode plates 12 are laminated and assembled into power generating element 18 as shown in FIG. 2. Although negative electrode collector 13a and negative electrode plate 13 are formed from one conductive material sheet in the present embodiment, negative electrode collector 13a and negative electrode plate 13 may be formed as separate component parts and joined to each other.

Negative electrode collectors 13a of negative electrode plates 13 are formed of, for instance, electrochemically stable metal foil such as nickel foil, copper foil, stainless foil or iron foil. Negative electrode layers 13b and 13c of negative electrode plates 13 are formed by, for instance, mixing a negative electrode active material capable of absorbing and desorbing lithium ions of the positive electrode active material, such as amorphous carbon material, non-graphitizable carbon material, graphitizable carbon material or graphite, with an aqueous dispersion medium of styrene-butadiene rubber powder as a precursor to organic sintered body, drying and pulverizing the resulting mixture, mixing the thus-obtained main material in which carbonized stylene-butadiene rubber is supported on surfaces of carbon particles with a binder such as acrylic resin emulsion, applying the resulting mixture composition to the parts of the main surfaces of negative electrode collector 13a and subjecting the applied mixture composition to drying and rolling.

When amorphous or non-graphitizable carbon material is used as the negative electrode active material, the output voltage of the battery decreases with discharge amount due to lack of flat potential profile during charging/discharging. The use of such amorphous or non-graphitizable carbon material as the negative electrode active material is thus advantageous for applications to power sources of electric vehicles in view of the occurrence of no sudden output drops.

Separators 12 of power generating element 18 function to prevent a short circuit between positive and negative electrode plates 11 and 13 and may have the function of retaining the electrolyte material. Each of separators 12 is in the form of for instance, a porous film of polyolefin such as polyethylene (PE) or polypropylene (PP) so as to close pores in the porous film by heat generation with the passage of overcurrent and thereby exhibit a current interrupt function.

In the present embodiment, separator 12 is not particularly limited to the single-layer polyolefin film. Separator 12 may alternatively have a three-layer structure in which a polypropylene film is sandwiched between polyethylene films or a laminated structure in which a porous polyolefin film is laminated to an organic nonwoven fabric etc. The formation of separator 12 with such a multilayer structure provides various functions such as overcurrent limiting function, electrolyte retaining function and separator shape maintaining (stiffness improving) function.

In power generating element 18, positive electrode plates 11 and negative electrode plates 13 are alternately laminated together with each of separators 12 interposed between adjacent positive and negative electrode plates 11 and 13. Two positive electrode plates 11 are connected via respective positive electrode collectors 11a to positive electrode tab 14 of metal foil, whereas three negative electrode plates 13 are connected via respective negative electrode collectors 13a to negative electrode tab 15 of metal foil.

The number of positive electrode plates 11, separators 12 and negative electrode plates 13 of power generating element 18 is not particularly limited to the above. For example, it is alternatively feasible to provide power generating element 18 with one positive electrode plate 11, two separators 12 and three negative electrode plate 13. The number of positive electrode plates 11, separators 12 and negative electrode plates 13 can be selected as needed.

There is no particular limitation on positive and negative electrode tabs 14 and 15 as long as each of positive and negative electrode tabs 14 and 15 is formed of an electrochemically stable metal material. Positive electrode tab 14 is formed of for instance, aluminum foil, aluminum alloy foil, copper foil or nickel foil with a thickness of about 0.2 mm as in the case of positive electrode collectors 11a. Negative electrode tab 15 is formed of, for instance, nickel foil, copper foil, stainless foil or iron foil with a thickness of about 0.2 mm as in the case of negative electrode collectors 13a.

As already mentioned above, electrode plate 11, 13 is connected to electrode tab 14, 15 by extending metal foil collector 11a, 13a of electrode plate 11, 13 to electrode tab 14, 15, that is, forming electrode layers (positive electrode layers 11b and 11c or negative electrode layers 13b and 13c) on some part of metal foil sheet 11a, 13a and utilizing the remaining end part of metal foil sheet 11a, 13a as a member for joining to electrode tab 14, 15. Alternatively, collector 11a, 13a between positive or negative electrode layers and the joining member may be formed from separate metal foil sheets and joined to each other. The following explanations specifically refer to the case where the collector between positive or negative electrode layers and the joining member are formed from one metal foil sheet.

Power generating element 18 is accommodated and sealed in upper and lower package members 16 and 17. Although not specifically illustrated in the drawings, each of upper and lower package members 16 and 17 has a three-layer structure including, in order from the inside to the outside of flat battery 1, an inner layer formed of a resin film having good electrolyte resistance and thermal adhesion properties, such as polyethylene, modified polyethylene, polypropylene, modified polypropylene or ionomer resin, an intermediate layer formed of metal foil such as aluminum foil and an outer layer formed of a resin film having good electrical insulating properties, such as polyamide resin or polyester resin.

In other words, each of upper and lower package members 16 and 17 is formed of a flexible material such as a resin-metal thin-film laminate material having a metal foil sheet such as aluminum foil, a film of polyethylene, modified polyethylene, polypropylene, modified polypropylene or ionomer resin laminated on one surface of the metal foil (the inner side of flat battery 1) and a film of polyamide resin or polyester resin laminated on the other surface of the metal foil (the outer side of flat battery 1).

Package member 16, 17 itself can be increased in strength by providing not only the resin layers but also the metal layer in package member 16, 17 as mentioned above. Further, package member 16, 17 can secure good thermal adhesion to metal electrode tab 14, 15 by forming the inner layer of package member 16, 17 of e.g. polyethylene, modified polyethylene, polypropylene, modified polypropylene or ionomer resin.

As shown in FIGS. 1 and 2, positive electrode tab 14 is taken out of one end side of package members 16 and 17; and negative electrode tab 15 is taken out of the other end side of package members 16 and 17. As there are some clearance made in thermal fusion parts between package members 16 and 17 according to the thickness of positive and negative electrode tabs 14 and 15, seal films of polyethylene, polypropylene etc. may be arranged in the contact parts between electrode tabs 14 and 15 and package members 16 and 17 so as to maintain the sealing of the inside of flat battery 1. The seal film is preferably formed of the same kind of resin material as that of package members 16 and 17, in terms of the thermal adhesion properties, against each of positive and negative electrode tabs 14 and 15.

Power generating element 18 and parts of positive and negative electrode tabs 14 and 15 are enclosed in package members 16 and 17. The inner space defined by package members 16 and 17 is sucked to vacuum while being filled with a liquid electrolyte solution of lithium salt such as lithium perchlorate, lithium fluoroborate or lithium hexafluorophosphate as a solute in an organic liquid solvent. After that, outer peripheral edges of package members 16 and 17 are thermally fused to each other by heat pressing.

Examples of the organic liquid solvent are ester solvents such as propylene carbonate (PC), ethylene carbonate (EC), dimethyl carbonate (DMC) and methyl ethyl carbonate. In the present embodiment, the organic liquid solvent is not limited to the above. There can alternatively be used an organic liquid solvent prepared by mixing an ether solvent such as γ-butyrolactone (γ-BL) or diethoxyethane (DEE) or other solvent with the ester solvent.

The basic structure of flat battery 1 according to the present embodiment has been described above. The joint part between electrode tab 14, 15 and collectors 11a, 13a will be next explained below in detail.

First Embodiment

Figure 3:
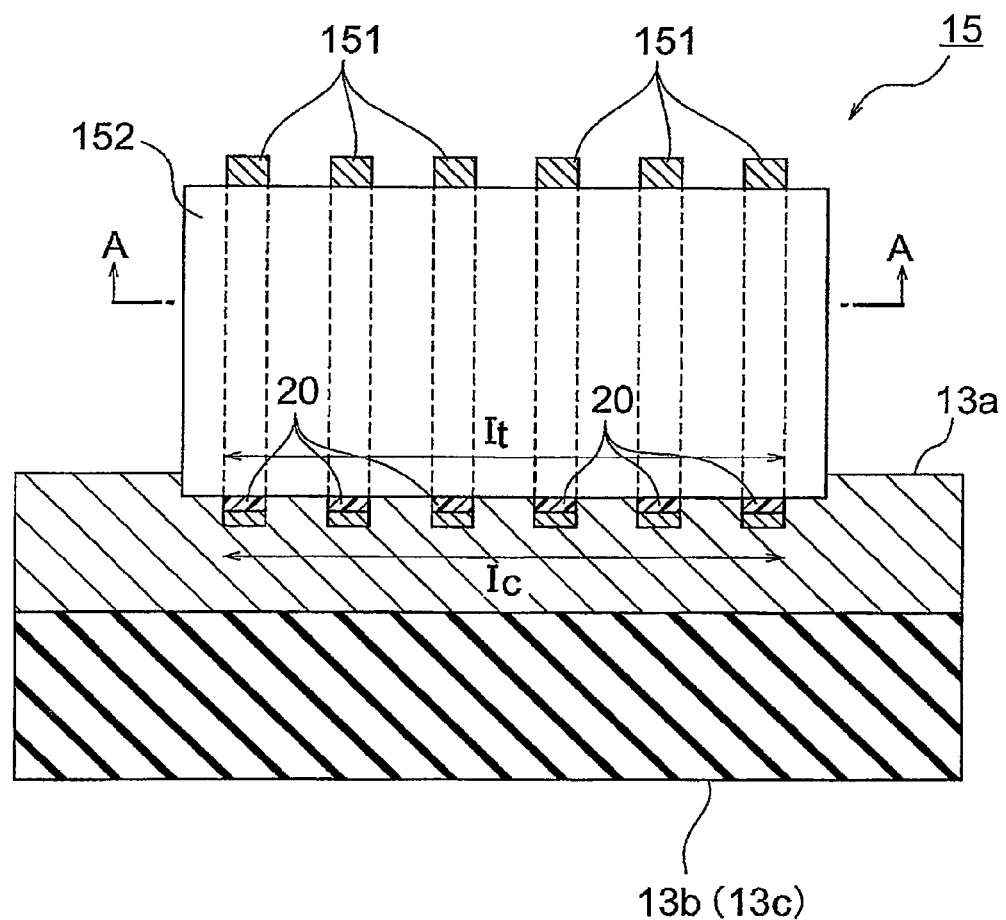
FIG. 3 is an enlarged plan view of a joint part between a negative electrode tab and negative electrode collectors in the flat battery of FIG. 1.
Figure 4:
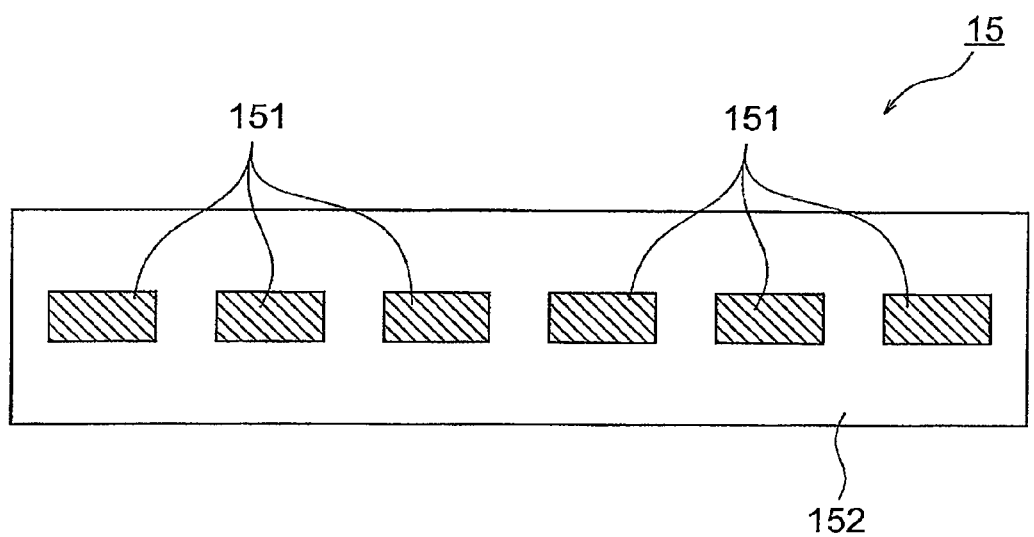
FIG. 4 is a cross-sectional view taken along line A-A of FIG. 3.

FIG. 3 is an enlarged plan view of the joint part between negative electrode tab 15 and negative electrode collectors 13a. Herein, package members 16 and 17 and power generating element 18 are omitted from FIG. 3. The joint part between positive electrode tab 14 and positive electrode collectors 11a is similar in structure to the joint part between negative electrode tab 15 and negative electrode collectors 13a. FIG. 4 is a cross-sectional view taken along line A-A of FIG. 3.

Negative electrode tab 15 and three negative electrode collectors 13a are joined together by ultrasonic welding via e.g. six weld joints 20. Negative electrode tab 15 has conducting portion 151 divided into a plurality of elements and insulating portion 152 covering conducting portion 151. More specifically, conducting portion 151 has six cable-shaped flat conductors formed of a conductive material (conductor material) such as copper and individually welded by respective weld joints 20 to negative electrode collectors 13a. The six conductors of conducting portion 151 are shaped in such a manner as to extend from negative electrode collectors 13a toward the outer peripheral edges of package members 16 and 17.

Conducting portion 151 is covered by insulating portion 152 such that insulating portion 152 holds side surfaces of the flat conductors of conducing portion 151 and thereby keeps these conductors of conducting portion 151 insulated from each other. Insulating portion 152 is arranged between the plurality of conductors of conducting portion 151 along the plane direction (i.e. the after-mentioned direction of expansion/contraction) of negative electrode collectors 13a. Further, insulating portion 152 is formed of a material such as resin having higher elasticity than that of conducting portion 151. The term "elasticity" herein refers to the ability of the material to expand and contract under thermal stress or mechanical stress etc.

FIG. 3 corresponds to a plan view of negative electrode tab 15 and negative electrode collectors 13a when viewed from the bottom side of FIG. 2 (the side of lower package member 17). Although negative electrode tab 15 is illustrated as being short in length in the drawing, it is feasible to extend negative electrode tab 15 to an arbitrary length. In one example, negative electrode tab 15, which has conducting portion 151 with a plurality of conductors and insulating portion 152, as a whole can be provided in the form of a flexible cable and thereby can be bent and twisted. In another example, insulating portion 152 can be formed from any resin material of relatively high rigidity so that negative electrode tab 15 can maintain its shape. Ends of the conductors of conducting portion 151 are exposed from insulating portion 152 at both end parts of negative electrode tab 15. One of the exposed ends of each conductor of conducting portion 151 is joined by weld joint 20 to negative electrode collectors 13a. The other exposed end of each conductor of conducting portion 151 is connected to a wire (not shown) outside of flat battery 1.

In the above-mentioned structure of flat battery 1, the electrode tab such as positive electrode tab 14 or negative electrode tab 15 and the collectors such as positive electrode collectors 11a or negative electrode collectors 13a are mechanically pressed or subjected to heat generated by ultrasonic vibrations during the welding thereof. This can lead to a difference in expansion/contraction rate between electrode tab 14, 15 and collectors 11a, 13a even in the case where electrode tab 14, 15 and collectors 11a, 13a are formed of the same kind of material.

There is thus a possibility of wrinkles in collectors 11a, 13a and separations in weld joints 20 when collectors 11a, 13a expand more than electrode tab 14, 15 during the welding. Similarly, there is a possibility of wrinkles in electrode tab 14, 15 and separations in weld joints 20 when electrode tab 14, 15 expands more than collectors 11a, 13a during the welding. It is herein defined in FIG. 3 that: the distance Ic is a distance between outermost two of conductors of conducting portion 151 covered by insulating portion 152; and the joint distance It is a distance between outermost two of weld joints 20. In the case e.g. where the distance Ic increases by expansion of negative electrode collectors 13a under the influence of heat during the welding, there occur wrinkles in electrode tab 15 or negative electrode collectors 13a and separations in weld joints 20 unless the joint distance It changes in response to such expansion.

In flat battery 1 of the present embodiment, however, electrode tab 14, 15 has insulating portion 152 formed of the material having higher elasticity than that of conducting portion 151 as mentioned above. For example, when collectors 11a, 13a expand under the influence of heat during the welding, insulating portion 152 expands so as to follow and allow for the expansion of collectors 11a, 13a and thereby prevent wrinkles in collectors 11a, 13a while maintaining the joint strength of weld joints 20. When collectors 11a, 13a contract at the temperature drop after the welding, insulating portion 152 contracts so as to follow and allow for the contraction of collectors 11a, 13a and thereby prevent wrinkles in collectors 11a, 13a while maintaining the joint strength of weld joints 20. Thus, the welding stress is not focused on weld joints 20 and can be relieved by insulating portion 152 so as to prevent separations in weld joints 20.

In electrode tab 14, 15, conducting portion 151 is provided with the plurality of cable-shaped conductors; and insulating portion 152 is arranged between these conductors of conducting portion 151 in the present embodiment. When the distance between weld joints 20 changes by expansion and contraction of collectors 11a, 13a at the time of welding, the distance between the conductors of conducting portion 151 changes in response to the expansion and contraction of collectors 11a, 13a so that the stress due to such expansion and contraction can be relieved by insulating portion 152.

Although insulating portion 152 is provided in electrode tab 14, 15 and adapted to relieve the welding stress in the present embodiment, it is alternatively feasible to adopt any other component part such as conductor having higher elasticity than conducting portion 151 as a stress relieving portion in place of insulating portion 152. In the present embodiment, the conductors of conducting portion 151 are provided in flat cable form but may alternatively be provided in circular cross-section cable form or may not necessarily be provided in cable form.

In the present embodiment, insulating portion 152 corresponds to a stress relieving portion of the present invention.

Second Embodiment

Figure 5:
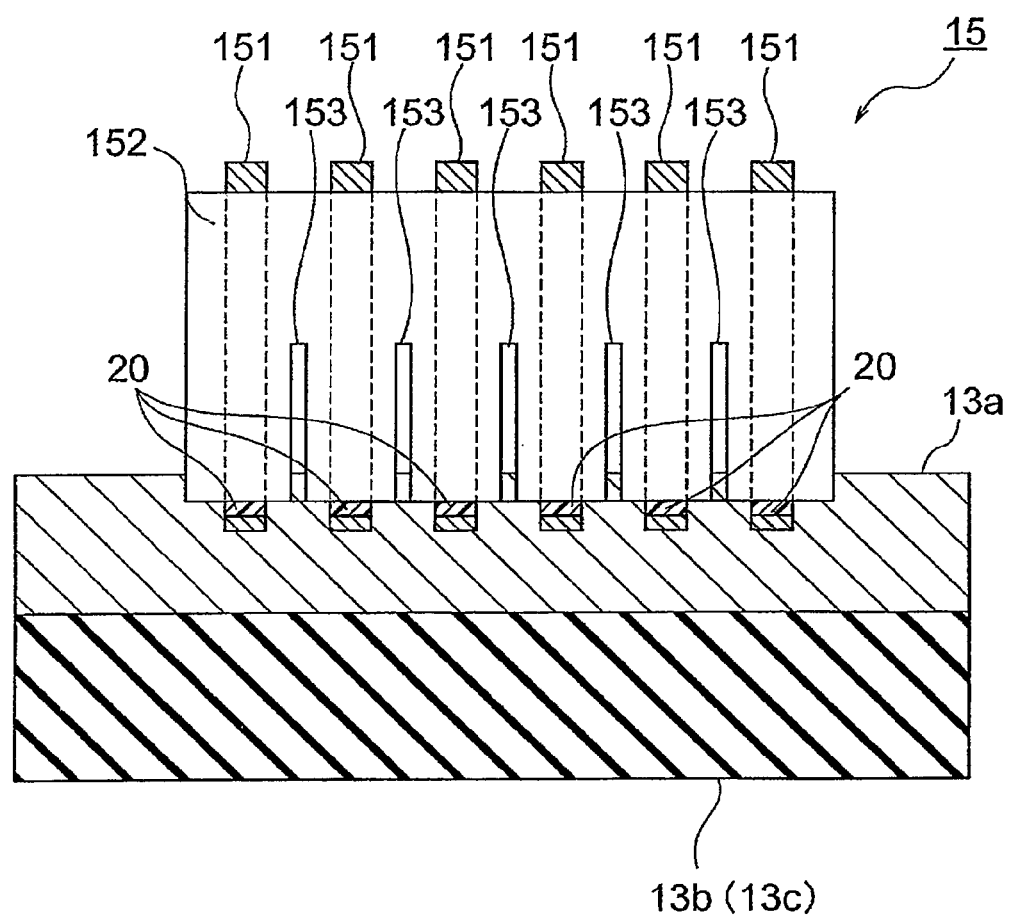
FIG. 5 is an enlarged plan view of a joint part between a negative electrode tab and negative electrode collectors according to another exemplary embodiment of the present invention.

FIG. 5 is an enlarged plan view of the joint part between negative electrode tab 15 and negative electrode collectors 13a according to another exemplary embodiment of the present invention. Herein, package members 16 and 17 and power generating element 18 are omitted from FIG. 5. The overall structure of flat battery 1 of the present embodiment is the same as that of the embodiment mentioned above with reference to FIGS. 1 and 2. The joint part between positive electrode tab 14 and positive electrode collectors 11a is similar in structure to the joint part between negative electrode tab 15 and negative electrode collectors 13a as shown in FIGS. 1 and 2.

Negative electrode tab 15 of the present embodiment shown in FIG. 5 is different from that shown in FIG. 3, in that slits 153 are formed in negative electrode tab 15. As to the other configurations, the above explanation of the first embodiment can be applied as appropriate.

In negative electrode tab 15, slits 153 are formed at positions between the plurality of conductors of conducting portion 151 by making cuts in insulating portion 152 from an end surface of insulating portion 152 facing negative electrode collectors 13a toward the outer peripheral edges of package members 16 and 17. Slits 153 extend along the direction of center axes of the conductors of conducting portion 151 in such a manner that ends of slits 153 are located at or around the center of insulating portion 152 in the axis direction. The width of slits 153 is preferably made greater than or equal to one-half of the distance between the conductors of conducting portion 151 and smaller than the length of the conductors of conducting portion 151 in the width direction (i.e., the direction perpendicular to the axis direction). In this configuration, the expansion and contraction of conducting portion 151 can be relieved by slits 151 at the time of welding.

As mentioned above, slits 153 are formed in insulating portion 152 in such a manner that each of slits 153 extends from collectors 11a, 13a toward the outer peripheral edges of package members 16 and 17 in the present embodiment. When collectors 11a, 13a or electrode tab 14, 15 expand during the joining of weld joints 20, slits 153 are widened so as to thereby prevent wrinkles in collectors 11a, 13a while maintaining the joint strength of weld joints 20. When collectors 11a, 13a or electrode tab 14, 15 contract, slits 153 are narrowed so as to thereby prevent wrinkles in collectors 11a, 13a while maintaining the joint strength of weld joints 20.

As slits 153 are formed in insulating portion 152, insulating portion 152 can expand or contract with a small force relative to the welding stress on collectors 11a, 13a or electrode tab 14, 15. This allows easier expansion and contraction of insulating portion 152 so as to effectively reduce the stress load on weld joints 20.

Figure 6:
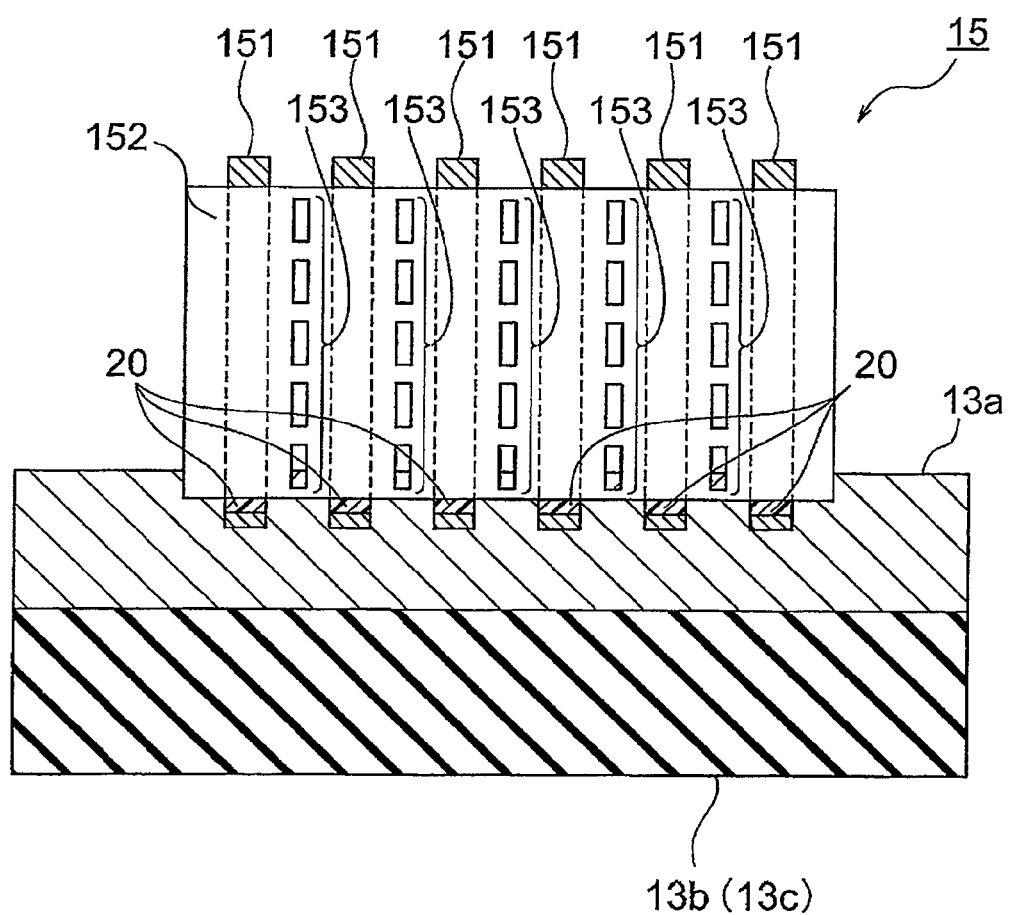
FIG. 6 is an enlarged plan view of a joint part between a negative electrode tab and negative electrode collectors according to another exemplary embodiment of the present invention.

In the present embodiment, one slit 153 is formed between adjacent conductors of conducting portion 151 as shown in FIG. 5. A plurality of slits 153 may alternatively be formed by making a plurality of cuts in a broken-line manner between adjacent conductors of conducting portion 151 as shown in FIG. 6. FIG. 6 is an enlarged plan view of the joint part between negative electrode tab 15 and negative electrode collectors 13a, according to another exemplary embodiment of the present invention, as corresponding to FIG. 5. The length of a broken line formed by slits 153 is preferably made greater than or equal to one-half of the length of the conductors of conducting portion 151 in the axis direction and smaller than the length of insulating portion 152 in the axis direction.

Figure 7:
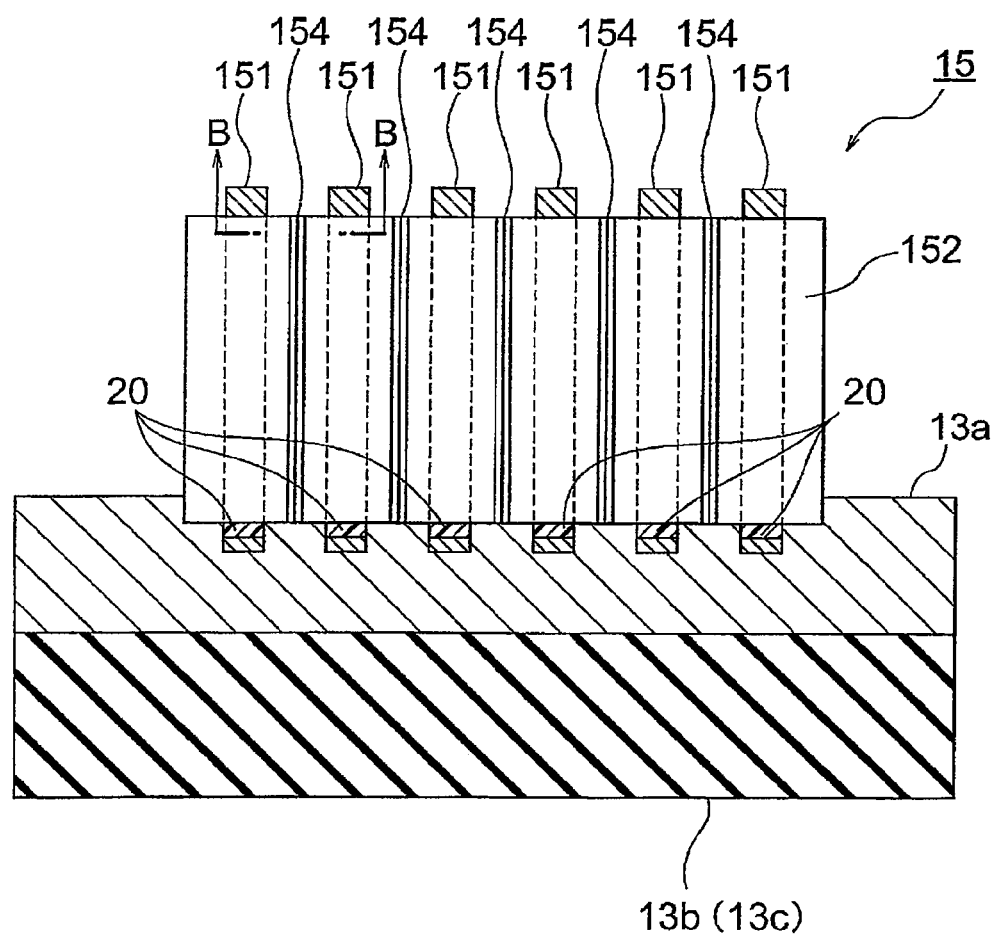
FIG. 7 is an enlarged plan view of a joint part between a negative electrode tab and negative electrode collectors according to another exemplary embodiment of the present invention.
Figure 8:
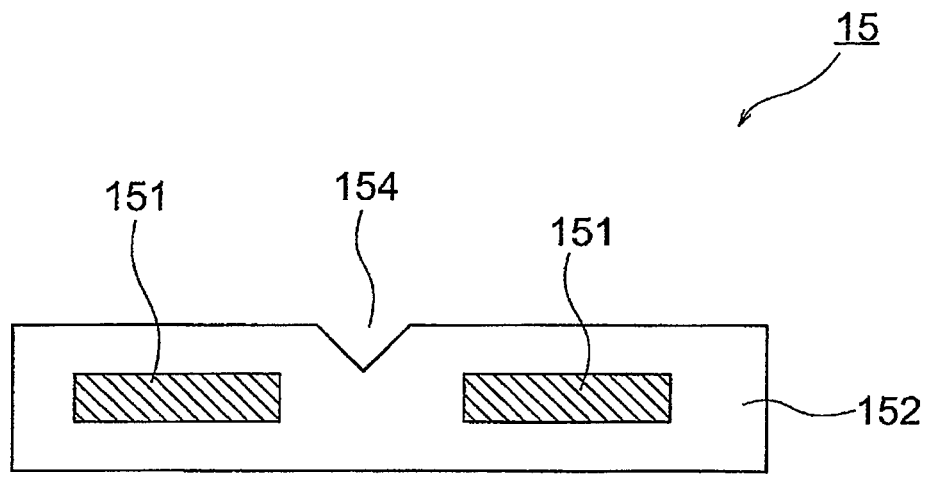
FIG. 8 is a cross-sectional view taken along line B-B of FIG. 7.

As shown in FIGS. 7 and 8, recesses 154 may alternatively be formed in place of slits 153. FIG. 7 is an enlarged plan view of the joint part between negative electrode tab 15 and negative electrode collectors 13a, according to another exemplary embodiment of the present invention, as corresponding to FIG. 5. FIG. 8 is a cross-sectional view taken along line B-B of FIG. 7. Recesses 154 are formed in a main surface of insulating portion 152 at positions between the conductors of conducting portion 151 in such a manner as to extend along the axis direction of the conductors of conducting portion 151. The thickness of part of insulating portion 152 in which recesses 154 are formed is smaller than the thickness of part of insulating portion 152 in which recesses 154 are not formed. Further, the length of recesses 154 along the axis direction of the conductors of conducting portion 151 is preferably made greater than or equal to one-half of the length of the conductors of conducting portion 151 in the axial direction thereof and smaller than the length of insulating portion 152 in the axial direction. This allows easier expansion and contraction of the part of insulating portion 152 in which recesses 154 are formed when collectors 11a, 13a or electrode tab 14, 15 expand and contract at the time of joining of weld joints 20, so as to effectively reduce the stress load on weld joints 20 and to prevent wrinkles in collectors 11a, 13a while maintaining the joint strength of weld joints 20.

Figure 9:
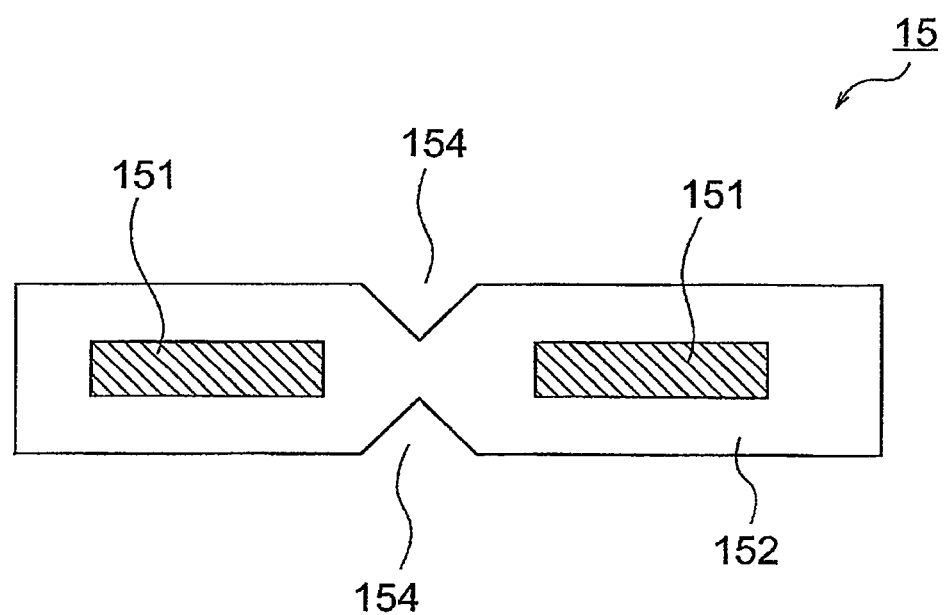
FIG. 9 is a cross-sectional view of a negative electrode tab in a joint part between the negative electrode tab and negative electrode collectors according to another exemplary embodiment of the present invention.

Although recesses 154 are formed in one main surface of insulating portion 152 as shown in FIGS. 7 and 8 in the present embodiment, recesses 154 may alternatively be formed in both of main surfaces of insulating portion 152 as shown in FIG. 9. FIG. 9 is a cross-sectional view of part of negative electrode tab 15 as corresponding to FIG. 8.

In the present embodiment, slit 153 correspond to a cut of the present invention.

Third Embodiment

Figure 10:
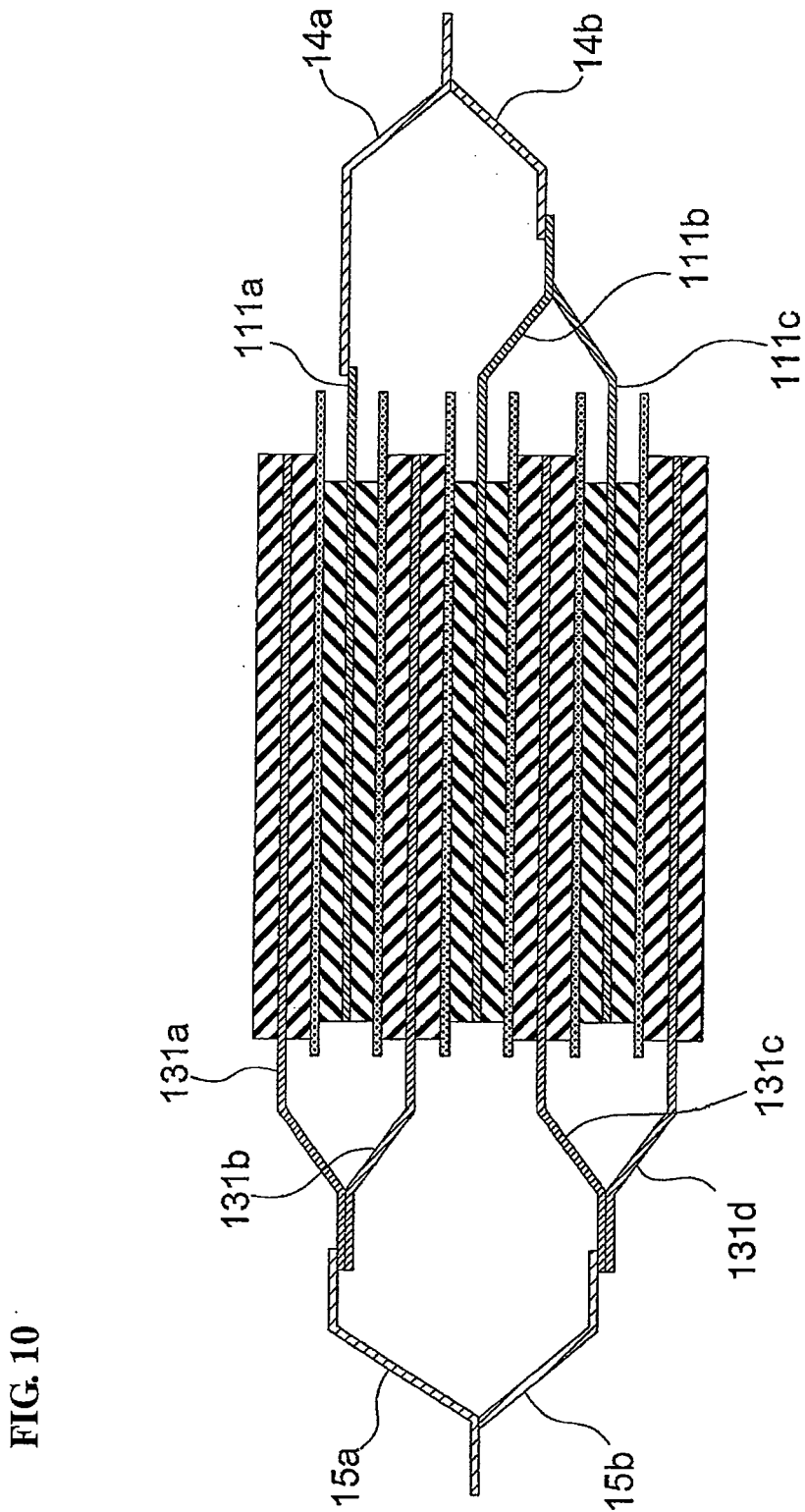
FIG. 10 is a cross-sectional view of a flat battery according to another exemplary embodiment of the present invention.

FIG. 10 is a cross-sectional view of flat battery according to another exemplary embodiment of the present invention. Herein, package members 16 and 17 are omitted from FIG. 10. The overall structure of flat battery 1 of the present embodiment is the same as that of the embodiment mentioned above with reference to FIGS. 1 and 2.

Flat battery 1 of the present embodiment is different from that of the above-mentioned first embodiment, in the structure of the joint part between electrode tab 14, 15 and collectors 11a, 13a. As to the other configurations, the above explanations of the first and second embodiments can be applied as appropriate.

As shown in FIG. 10, flat battery 1 includes four negative electrode plates 13 and three positive electrode plates 11 alternately laminated together. Among four negative electrode collectors 13a, two upper negative electrode collectors 131a and 131b are joined by welding to negative electrode tab part 15a; and two lower negative electrode collectors 131c and 131d are joined by welding to negative electrode tab part 15b. Among three positive electrode collectors 11a, one upper positive electrode collector 111a is joined by welding to positive electrode tab part 14a; and two lower positive electrode collectors 111b and 111c are joined by welding to positive electrode tab part 14b.

In the first embodiment, electrode tab 14, 15 and collectors 11a, 13a are joined together at a joint position adjacent to the sealing position of package members 16 and 17. In the present embodiment, by contrast, electrode tab 14, 15 and collectors 11a, 13a are joined together at a joint position closer to power generating element 18 than the joint position of the first embodiment.

Electrode tab 14, 15 is introduced toward collectors 11a, 13a from the sealing position of package members 16 and 17, and then, is branched into two upper and lower layers at some midpoint within the inner space of flat battery 1. Namely, one end of negative electrode tab 15 is divided into negative electrode tab parts 15a and 15b; and one end of positive electrode tab 14 is divided into positive electrode tab parts 14a and 14b.

Figure 11:
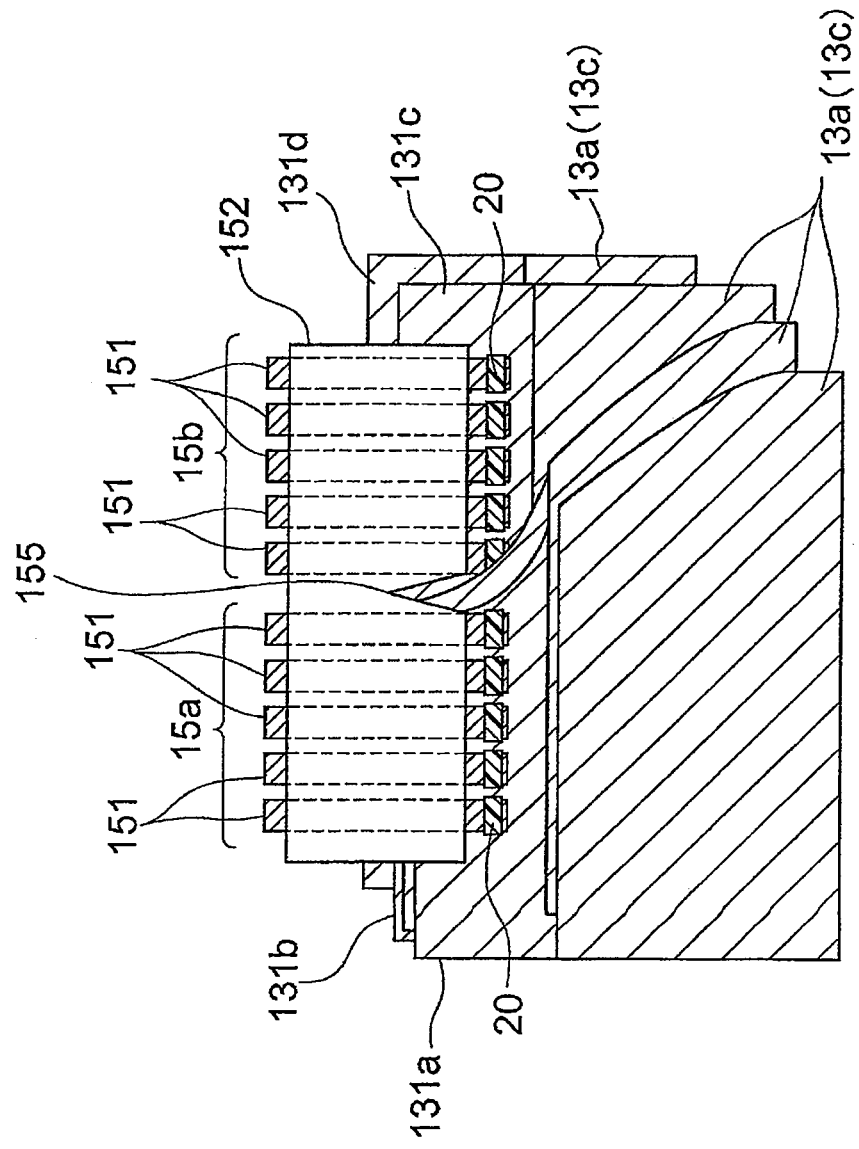
FIG. 11 is an enlarged plan view of a joint part between a negative electrode tab and negative electrode collectors in the flat battery of FIG. 10.

Next, the joint part between negative electrode tab 15 and collectors 13a will be explained below with reference to FIG. 11. FIG. 11 is an enlarged plan view of the joint part between negative electrode tab parts 15a and 15b and negative electrode collectors 131a, 131b, 131c and 131d. Herein, package members 16 and 17 and power generating element 18 are omitted from FIG. 11. As the joint part between positive electrode tab 14 and positive electrode collectors 11a is similar in structure to the joint part between negative electrode tab 15 and negative electrode collectors 13a, the explanation of the joint part between positive electrode tab 14 and positive electrode collectors 11a will be omitted herefrom.

Negative electrode tab parts 15a and 15b provide a plurality of conducting portions 151 each covered by insulating portion 152 so that conductors of conducting portions 151 of negative electrode tab parts 15a 15b are kept insulated from each other within the inner space of flat battery 1. The conductors of conducting portion 151 of negative electrode tab part 15a are joined by weld joints 20 to negative electrode collectors 131a and 131b, whereas conductors of conducting portion 151 of negative electrode tab part 15b are joined by weld joints 20 to negative electrode collectors 131c and 131d. Thus, insulating portion 152 is partially split at a position between conducting portions 151 of negative electrode tab parts 15a and 15b so that such a split extends from negative electrode collector 13a toward the outer peripheral edges of package members 16 and 17 and serves as slit 155.

In contrast to the present embodiment, in the case of joining a plurality of plate-shaped collectors to one plate-shaped electrode tab, the distance between two outermost weld joints 20 becomes relatively large because of the necessity to provide weld joints 20 according to the width of the collectors and the width of the electrode tab. This leads to a large stress load on weld joints 20 due to an increase in the amount of expansion and contraction of the distance between outermost weld joints 20 when the collectors or electrode tab expand and contract at the time of welding.

On the other hand, negative electrode collectors 13a and 13b and negative electrode tab part 15a are joined together; and negative electrode collectors 13c and 13d and negative electrode tab part 15b are joined together in the present embodiment. Further, positive electrode collector 111a and positive electrode tab part 14a are joined together; and positive electrode collectors 111b and 111c and positive electrode tab part 14b are joined together. As the width of electrode tab 14, 15 is divided and joined to the plurality of collectors 131a, 131b, 131c and 131d or collectors 111a, 111b and 111c, the distance between outermost weld joints 20 in each joint part (corresponding to the distance It of FIG. 3) can be decreased so as to relieve the stress on weld joints 20 and thereby effectively prevent wrinkles in electrode tab 14, 15 and collectors 11a, 13a and separations in weld joints 20.

In the present embodiment, conducting portions 151 of negative electrode tab parts 15a and 15b are kept insulated from each other by insulating portion 152 within the inner space of flat battery 1 so that a current generated by an electromotive force of power generating element 18 independently flows through conducting portions 151 of negative electrode tab parts 15a and 15b. In this configuration, a charging current can be fed through conducting portions 151 of negative electrode tab parts 15a and 15b independently respectively during charging of flat battery 1. It is thus feasible, by selecting the conduction paths of conducting portions 151 connected to wires outside of flat battery 1 under the control of a charging/discharging control unit at the time of charging/discharging, to selectively feed the current through e.g. the conductors of conducting portion 151 of negative electrode tab part 15a. In the event of e.g. a short circuit or deterioration caused due to battery lifetime in the vicinity of negative electrode collector 131c, the charging current can be externally controlled so as not to flow through negative electrode tab part 15c joined to such short-circuited or deteriorated negative electrode collector 131c. This makes it possible to prevent a voltage drop caused by current leakage due to the flow of the charging current through the short-circuited or deteriorated part. A discharging current can be also controlled so as not to flow through the short-circuited or deteriorated part during discharging. This makes it possible to prevent variations in the voltage of flat battery 1.

Further, slit 155 is formed between conducting portions 151 of negative electrode tab parts 15a and 15b. When collectors 11a, 13a or electrode tab 14, 15 expand during the joining of weld joints 20, slit 155 is widened so as to prevent wrinkles in collectors 11a, 13a while maintaining the joint strength of weld joints 20. When collectors 11a, 13a or electrode tab 14, 15 contract, slit 155 is narrowed so as to prevent wrinkles in collectors 11a, 13a while maintaining the joint strength of weld joints 20.

In the present embodiment, slit 155 corresponds to a cut of the present invention.

Fourth Embodiment

Figure 12:
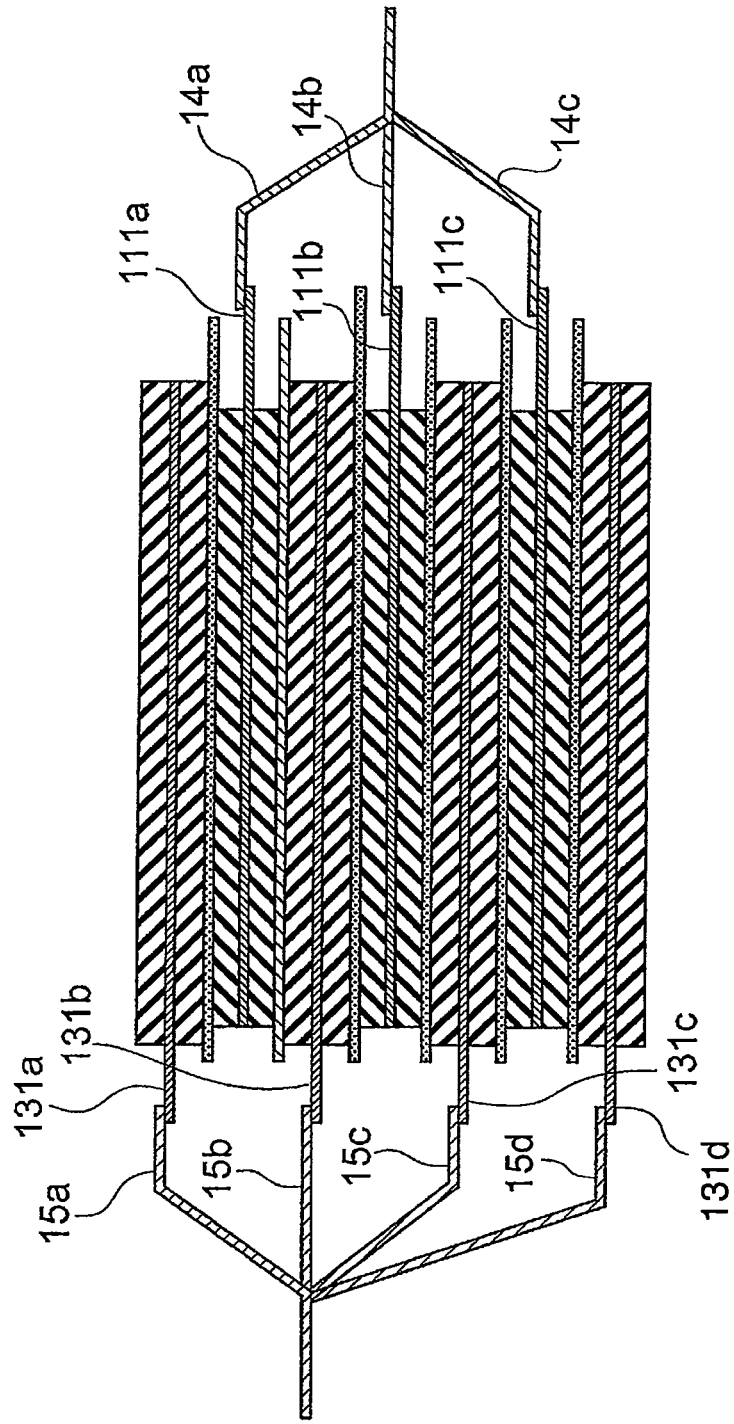
FIG. 12 is a cross-sectional view of a flat battery according to another exemplary embodiment of the present invention.

FIG. 12 is a cross-sectional view of flat battery according to another exemplary embodiment of the present invention. Herein, package members 16 and 17 are omitted from FIG. 12. The overall structure of flat battery 1 of the present embodiment is the same as that of the embodiment mentioned above with reference to FIGS. 1 and 2.

Flat battery 1 of the present embodiment is different from that of the above-mentioned first embodiment, in the structure of the joint part between electrode tab 14, 15 and collectors 11a, 13a. As to the other configurations, the above explanations of the first, second and third embodiments can be applied as appropriate.

As shown in FIG. 12, flat battery 1 includes four negative electrode plates 13 and three positive electrode plates 11 alternately laminated together in the present embodiment. Four negative electrode collectors 13a, which are numbered 131a, 131b, 131c and 131c in order from the upper side, are joined by welding to negative electrode tab parts 15a, 15b, 15c and 15d, respectively. Three positive electrode collectors 11a, which are numbered 111a, 111b and 111c in order from the upper side, are joined by welding to positive electrode tab parts 14a, 14b and 14c, respectively.

In the first embodiment, electrode tab 14, 15 and collectors 11a, 13a are joined together at a joint position adjacent to the sealing position of package members 16 and 17. In the present embodiment, by contrast, electrode tab 14, 15 and collectors 11a, 13a are joined together at a joint position closer to power generating element 18 than the joint position of the first embodiment.

Electrode tab 14, 15 is introduced toward collectors 11a, 13a from the sealing position of package members 16 and 17. Negative electrode tab 15 is branched into four layers at some midpoint within the inner space of flat battery 1, whereas positive electrode tab 14 is branched into three layers at some midpoint within the inner space of flat battery 1. Namely, one end of negative electrode tab 15 is divided into negative electrode tab parts 15a, 15b, 15c and 15d; and one end of positive electrode tab 14 is divided into positive electrode tab parts 14a, 14b and 14c.

Figure 13:
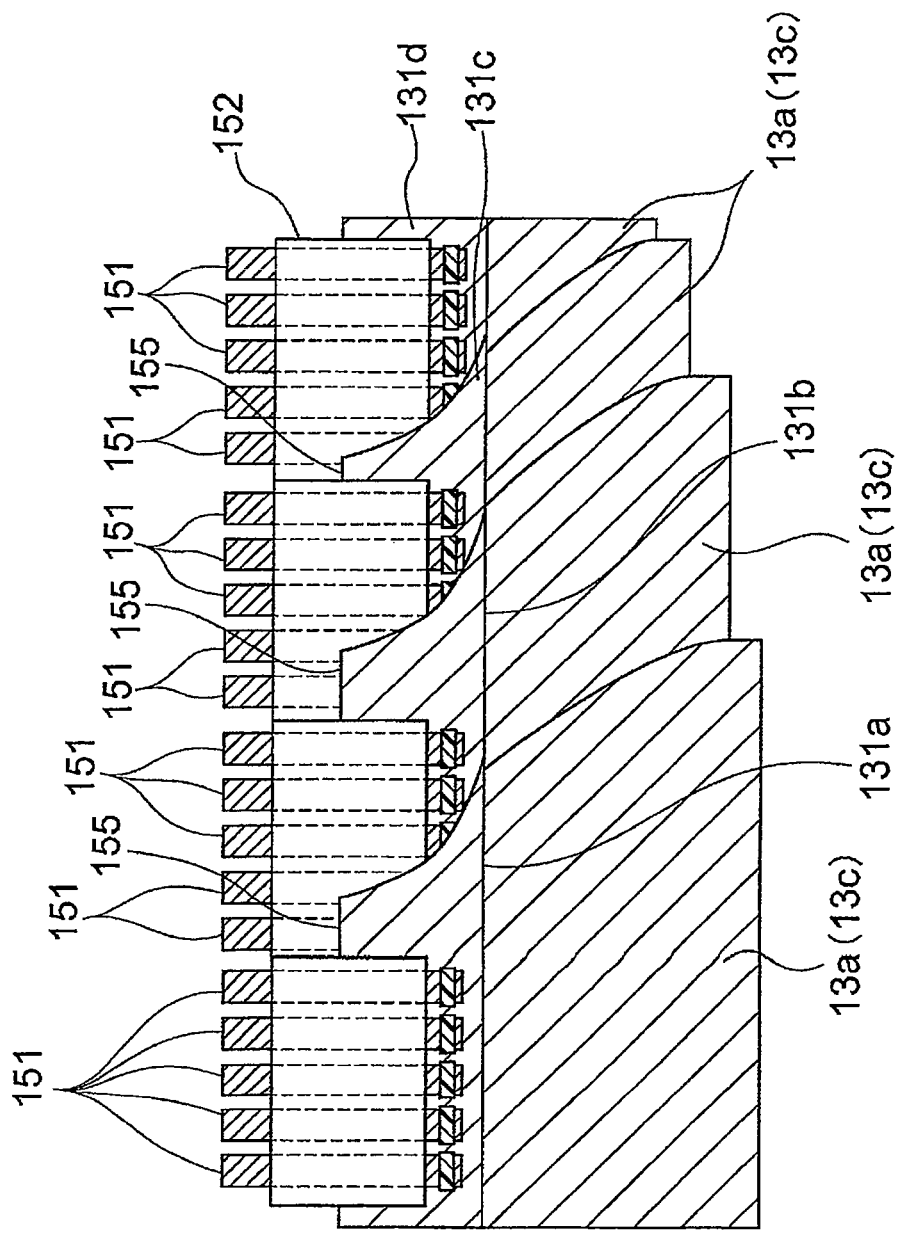
FIG. 13 is an enlarged plan view of a joint part between a negative electrode tab and negative electrode collector in the flat battery of FIG. 12.

Next, the joint part between negative electrode tab 15 and collectors 13a will be explained below with reference to FIG. 13. FIG. 13 is an enlarged plan view of the joint part between negative electrode tab parts 15a, 15b, 15c and 15d and negative electrode collectors 131a, 131b, 131c and 131d. Herein, package members 16 and 17 and power generating element 18 are omitted from FIG. 13. As the joint part between positive electrode tab 14 and positive electrode collectors 11a is similar in structure to the joint part between negative electrode tab 15 and negative electrode collectors 13a, the explanation of the joint part between positive electrode tab 14 and positive electrode collectors 11a will be omitted herefrom.

Negative electrode tab 15 provides a plurality of conducting portions 15 each covered by insulating portion 152 so that conductors of conducting portions 151 of negative electrode tab 15 are kept insulated from each other within the inner space of flat battery 1. The conductors of conducting portion 151 of negative electrode tab part 15a are joined by weld joints 20 to negative electrode collector 131a. Similarly, the conductors of other conducting portions 151 are joined by weld joint 20 to negative electrode collectors 131b, 131c and 131d.

As mentioned above, negative electrode tab 15 is divided into negative electrode tab parts 15a, 15b, 15c and 15d according to the number of negative electrode collectors 131a, 131b, 131c and 131d so that negative electrode collectors 131a, 131b, 131c and 131d are joined to negative electrode tab parts 15a, 15b, 15c and 15d, respectively, in the present embodiment. As a result of dividing negative electrode tab 15, slits 155 are formed in insulating portion 152 at positions between negative electrode tab parts 15a, 15b, 15c and 15d. The distance between outermost weld joints 20 in each joint part can be thus decreased so as to relieve the stress on weld joints 20 and thereby effectively prevent wrinkles in electrode tab 14, 15 and collectors 11a, 13a and separations in weld joints 20.

In the present embodiment, conducting portions 151 of negative electrode tab parts 15a, 15b, 15c and 15d are kept insulated from each other by insulating portion 152 within the inner space of flat battery 1 so that a current generated by an electromotive force of power generating element 18 independently flows through conducting portions 151. In this configuration, a charging current can be fed through conducting portions 151 independently respectively during charging of flat battery 1. It is thus feasible, by selecting the conduction paths of conducting portions 151 connected to wires outside of flat battery 1 under the control of a charging/discharging control unit at the time of charging/discharging, to selectively feed the current through the conductors of conducting portions 151. In the event of e.g. a short circuit or deterioration caused due to battery lifetime in the vicinity of any of negative electrode collectors 13a, the charging current can be externally controlled so as not to flow through negative electrode tab part 15c joined to such a short-circuited or deteriorated negative electrode collector 13a. This makes it possible to prevent a voltage drop caused by current leakage due to the flow of the charging current through the short-circuited or deteriorated part. A discharging current can be also controlled so as not to flow through the short-circuited or deteriorated part during discharging. This makes it possible to prevent voltage variations in flat battery 1. The same applies to prevent a voltage drop and voltage variations in flat battery 1 caused by current leakage on the positive electrode side.

Further, slits 155 are formed in insulating portion 152 at positions between conducting portions 151 of negative electrode tab 15 in the present embodiment. When collectors 11a, 13a or electrode tab 14, 15 expand during the joining of weld joints 20, slits 155 are widened so as to thereby prevent wrinkles in collectors 11a, 13a while maintaining the joint strength of weld joints 20. When collectors 11a, 13a or electrode tab 14, 15 contract, slits 155 are narrowed so as to thereby prevent wrinkles in collectors 11a, 13a while maintaining the joint strength of weld joints 20.

The present embodiment may be modified such that at least either one of positive electrode tab 14 and negative electrode tab 15 has a plurality of electrode tab parts joined to respective collectors 11a, 13a.

Fifth Embodiment

Figure 14:
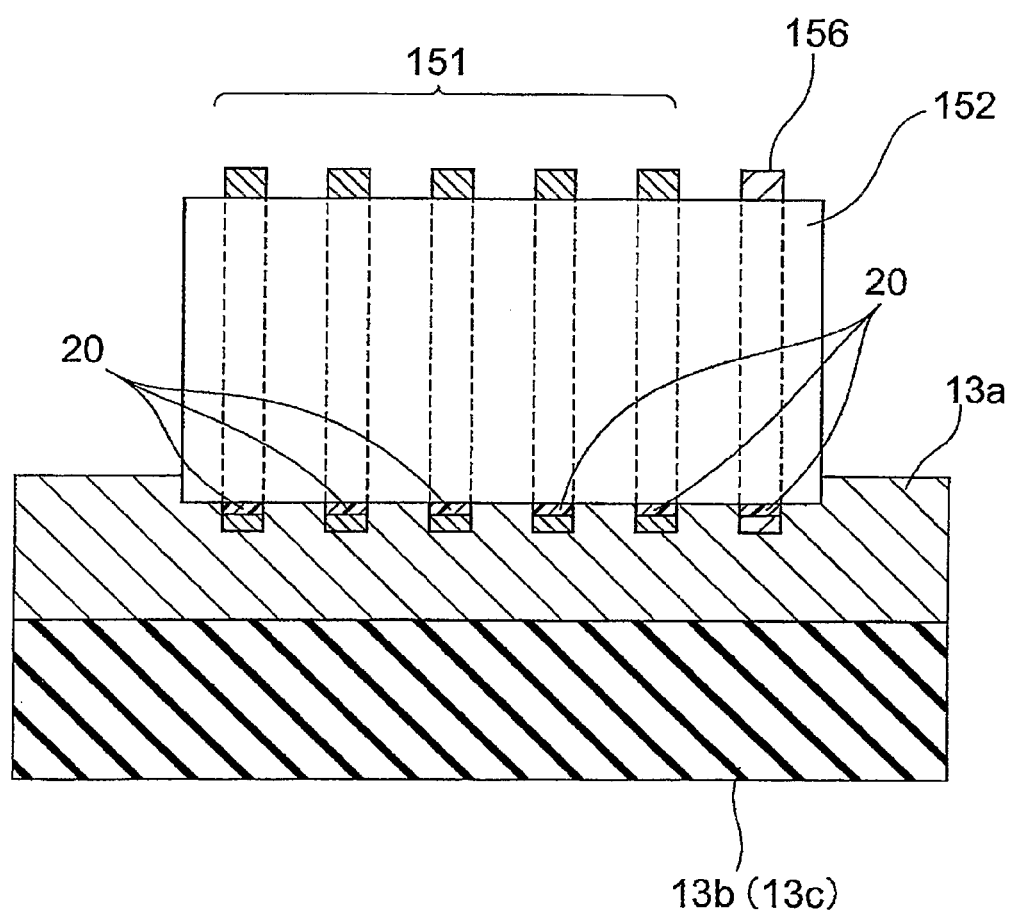
FIG. 14 is an enlarged plan view of a joint part between a negative electrode tab and negative electrode collectors according to another exemplary embodiment of the present invention.

FIG. 14 is an enlarged plan view of the joint part between negative electrode tab 15 and negative electrode collectors 13a according to another exemplary embodiment of the present invention. Herein, package members 16 and 17 and power generating element 18 are omitted from FIG. 14. The joint part between positive electrode tab 14 and positive electrode collectors 11a is similar in structure to the joint part between negative electrode tab 15 and negative electrode collectors 13a.

Negative electrode tab 15 and three negative electrode collectors 13a are joined together by ultrasonic welding via e.g. six weld joints 20. Negative electrode tab 15 has conducting portion 151 with a plurality of cable-shaped conductors, different type of conducting portion 156 and insulating portion 152 covering conducting portion 151 and different type of conducting portion 156. Conducting portion 151 has six cable-shaped flat conductors formed of a conductive material (conductor material) such as copper. Different type of conducting portion 156 is formed of a different conductive material from that of conducting portion 151 and, more specifically, formed as a cable of different metal. For example, different type of conducting portion 156 can be formed of Constantan etc. Thus, different type of conducting portion 156 is of a different kind of metal or semiconductor from conducting portion 151. The five conductors of conducting portion 151 and the conductor (or semiconductor) of different type of conducting portion 156 are shaped in such a manner as to extend from negative electrode collector 13a toward the outer peripheral edges of package members 16 and 17.

Conducting portion 151 and different type of conducting portion 156 are each covered by insulating portion 152 such that insulating portion 152 holds side surfaces of the flat conductors of conducing portions 151 and the conductor of different type of conducting portion 156 and keeps at least one of the conductors of conducting portion 151 insulated from the conductor of different type of insulating portion 156.

Negative electrode tab 15 as a whole can exhibit flexibility as mentioned above. Ends of the conductors of conducting portion 151 and ends of the conductor of different type of conducting portion 156 are exposed from insulating portion 152 at both end parts of negative electrode tab 15. One of the exposed ends of each conductor of conducting portion 151 or different type of conducting portion 156 is joined by weld joint 20 to negative electrode collectors 13a. The other exposed end of each conductor of conducting portion 151 or different type of conducting portion 156 is connected to a wire outside of flat battery 1.

Thus, conducting portion 151 and different type of conducting portion 156 are kept insulated from each other by insulating portion 152 within the inner space of flat battery 1. Herein, different type of conducting portion 156 and negative electrode collectors 13a are generally of different kinds of metals. There is a fear of corrosion (galvanic corrosion) in weld joint 20 where these different kinds of metals are held in contact with each other. In order to prevent such corrosion, a resin tape may be adhered to seal weld joint 20 of different type of conducting portion 156.

In the above-mentioned structure, the inside temperature of flat battery 1 can be detected by conducting portion 151 and different type of conducting portion 156. As conducting portion 151 and different type of conducting portion 156 are kept insulated from each other within the inner space of flat battery 1, the output current of power generating element 18 flows to the battery outside through the independent conduction paths of conducting portion 151 and different type of conducting portion 156. When the inside temperature of flat battery 1 is transferred to conducting portion 151 and different type of conducting portion 156, there arises a difference in temperature between conducting portion 151 and different type of conducting portion 156. As different type of conducting portion 156 is formed of different material from conducting portion 151, a voltage develops between conducting portion 151 and different type of conducting portion 156 by the Seebeck effect. The battery outside ends of conducting portion 151 and different type of conducting portion 156 are taken out of flat battery 1 and connected to a voltage sensor so that the inside temperature of flat battery 1 can be determined upon detection of the voltage by the voltage sensor. Namely, conducting portion 151 and different type of conducting portion 156 serve as points of contact to the voltage sensor; and the voltage sensor serves as a sensor for detecting the temperature of the inner space of battery.

Conventionally, a temperature sensor such as thermocouple is located outside of flat battery 1 so that the battery inside temperature is indirectly measured by the thermocouple for charging/discharging control of flat battery 1. When the temperature sensor such as thermocouple is disposed on battery package member 16, 17 to measure the battery temperature via package member 16, 17, it cannot be said that the sensor shows sufficient response to increases in the battery inside temperature. In the present embodiment, the battery inside temperature is measured by means of conducing portion 151 and different type of conducting portion 156 as mentioned above. This makes it possible to increase the response to battery temperature changes and improve the accuracy of detection of the battery inside temperature, in comparison to the case where the temperature sensor is located outside of the battery to measure the battery temperature.

In the present embodiment, conducting portions 151 and different type of conducting portion 156 are provided, but are not necessarily be provided, in cable form. Alternatively, conducting portions 151 and 156 may be provided in the form of e.g. thin plate-shaped metal tabs. Although five conductors are provided in conducting portion 151 in the present embodiment, the number of conductors in conducting portion 151 is not limited to five. It suffices that at least electrode tab 14, 15 is formed from two or more different kinds of metal and/or semiconductor materials and joined to collectors 11, 13.

EXAMPLES

The flat battery according to the present invention was tested for the effects of insulating portion 152 and slit 155 in Examples 1 and 2 and for the effects of different type of conducting portion 156 in Example 3 as follows.

Example 1

Figure 15:
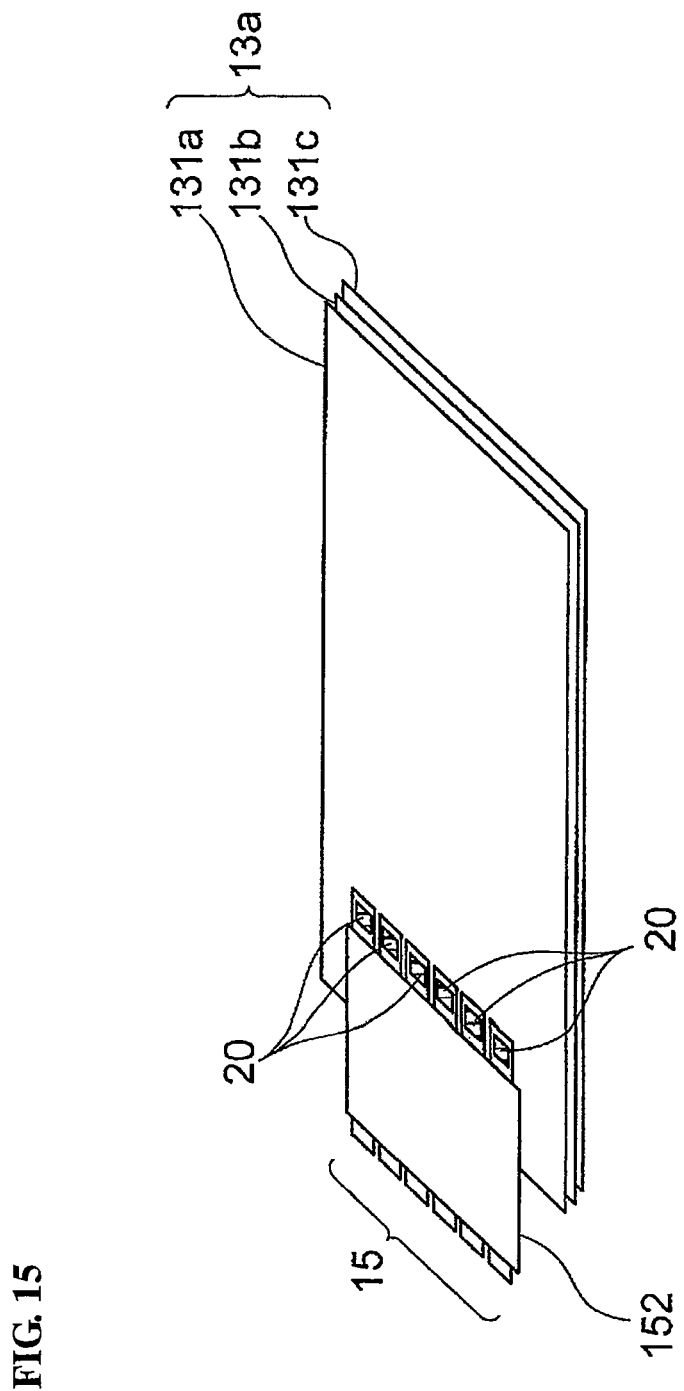
FIG. 15 is an enlarged plan view of a joint part between a negative electrode tab and negative electrode collectors in a flat battery according to Example 1.

Ten samples (N=10) were each produced using negative electrode tab 15 of FIG. 3. In each sample, negative electrode tab 15 and three negative electrode collectors 13a were joined together by ultrasonic welding via six weld joints 20 as shown in FIG. 15.

After the ultrasonic welding, negative electrode collector 13a was visually checked to examine the occurrence or non-occurrence of wrinkles in negative electrode collector 13a. Negative electrode collector 13a was subsequently held in a thermostat of 200° C. for 30 minutes, and then, visually checked to examine the occurrence or non-occurrence of wrinkles in negative electrode collector 13a. The test results are shown in TABLE 1.

Example 2

Figure 16:
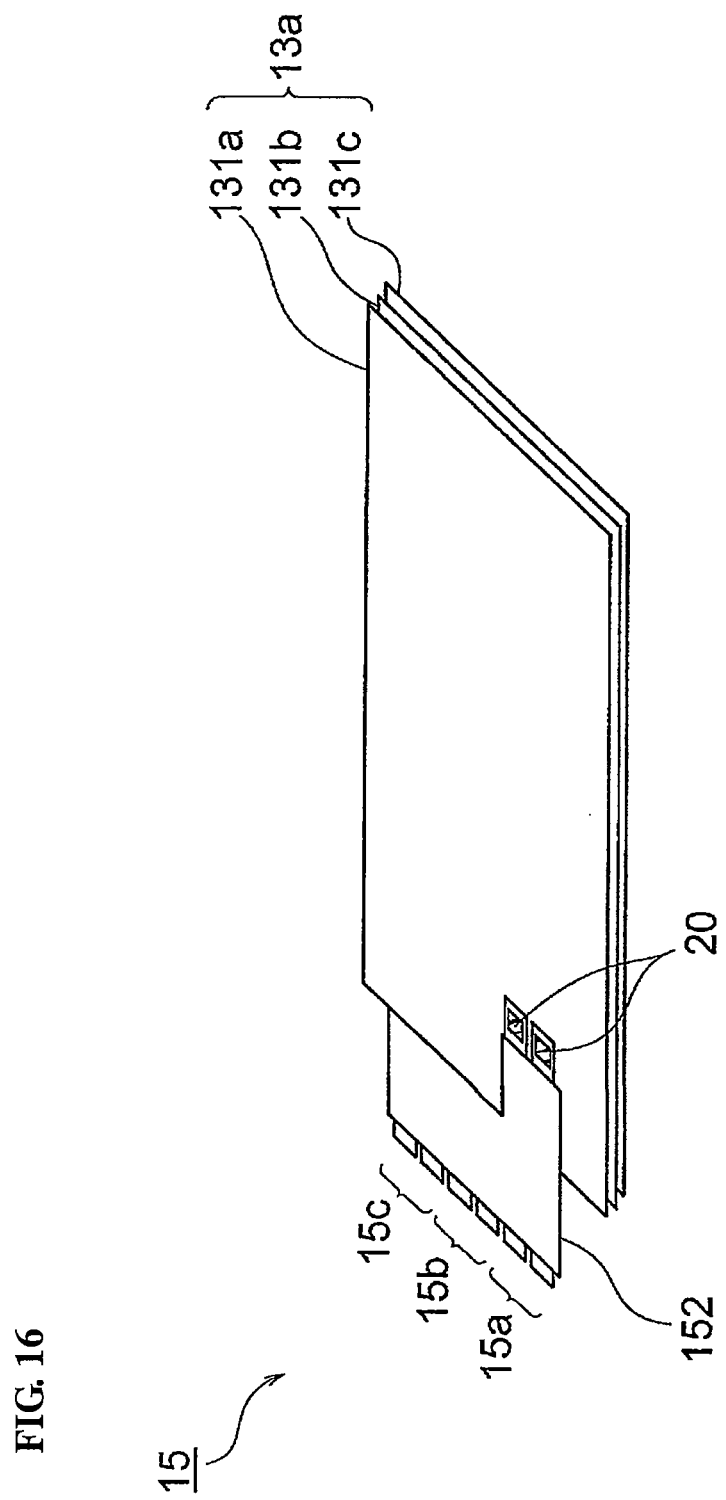
FIG. 16 is an enlarged plan view of a joint part between a negative electrode tab and negative electrode collectors in a flat battery according to Example 2.

Ten samples (N=10) were each produced using negative electrode tab 15 of FIG. 13. In each sample, negative electrode tab part 15a and negative electrode collector 131a were joined together by ultrasonic welding via two weld joints 20; negative electrode tab 15b and negative electrode collector 131b were joined together by ultrasonic welding via two weld joints 20; and negative electrode tab 15c and negative electrode collector 131c were joined together by ultrasonic welding via two weld joints 20 as shown in FIG. 16.

In the same manner as in Example 1, the occurrence or non-occurrence of wrinkles in negative electrode collector 13a was examined by visual check after the ultrasonic welding and after holding at 200° C. for 30 minutes.

Comparative Example 1

Figure 17:
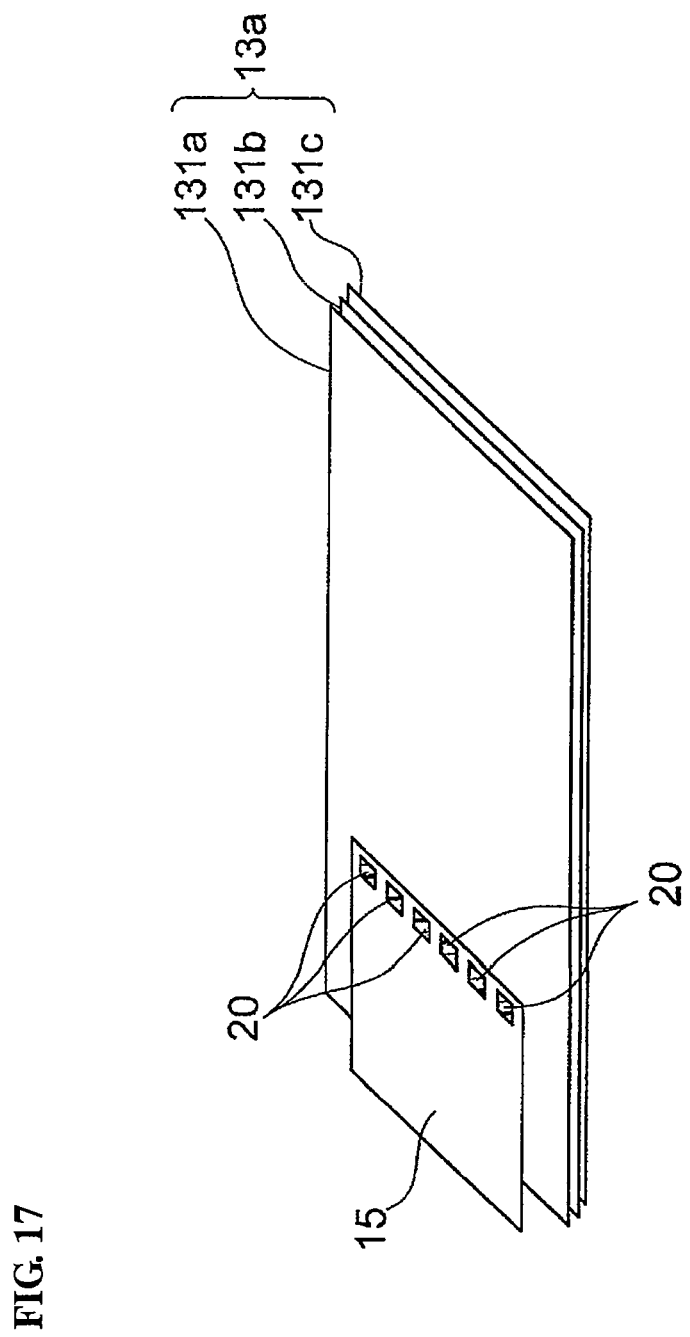
FIG. 17 is an enlarged plan view of a joint part between a negative electrode tab and negative electrode collectors in a flat battery according to Comparative Example 1.

As a comparative example to Examples 1 and 2, ten samples (N=10) were each produced using a negative electrode tab with no insulating portion 152. In each sample, negative electrode tab 15 and three negative electrode collectors 131a, 131b and 131c were joined together by ultrasonic welding via six weld joints as shown in FIG. 17.

In the same manner as in Examples 1 and 2, the occurrence or non-occurrence of wrinkles in negative electrode collector 13a was examined by visual check after the ultrasonic welding and after holding at 200° C. for 30 minutes.

TABLE 1

|  | Wrinkle occurrence rate immediately after welding | Wrinkle occurrence rate after 200° C. × 30 minutes |
| --- | --- | --- |
| Example 1 | 10% | 10% |
| Example 2 | 0% | 0% |
| Comparative Example 1 | 60% | 100% |

As is seen from the test results of TABLE 1, the wrinkle occurrence rate was 60% (wrinkles were detected in six out of ten samples) immediately after the ultrasonic welding in Comparative Example 1. On the other hand, the wrinkle occurrence rate was reduced to only 10% in Example 1 and to 0% in Example 2. The wrinkle occurrence rate was increased to 100% after 200° C.×30 minutes in Comparative Example 1 but was limited to only 10% in Example 1 and to 0% in Example 2.

Example 3

Figure 18:
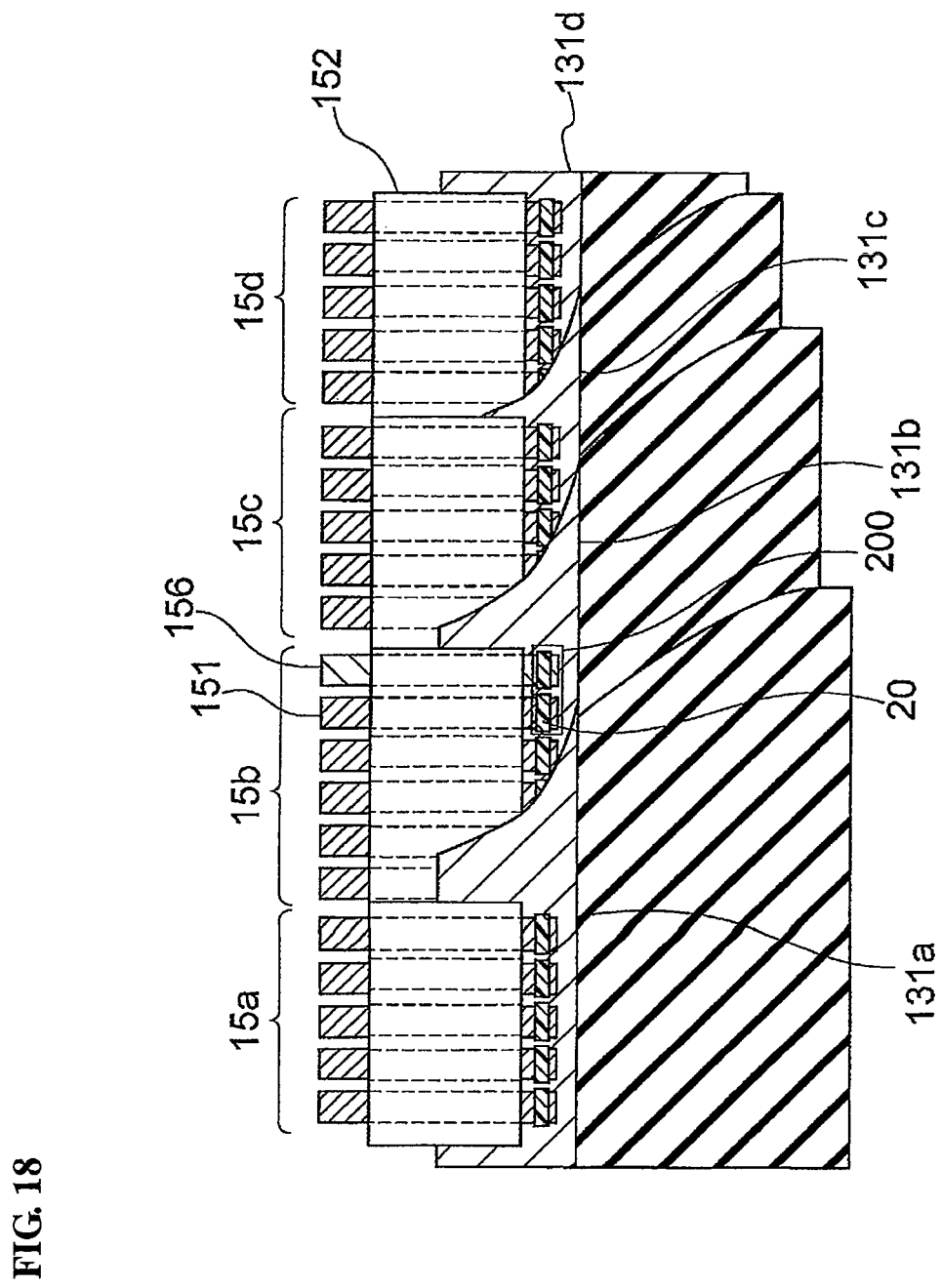
FIG. 18 is an enlarged plan view of a joint part between a negative electrode tab and negative electrode collectors in a flat battery according to Example 3.
Figure 19:
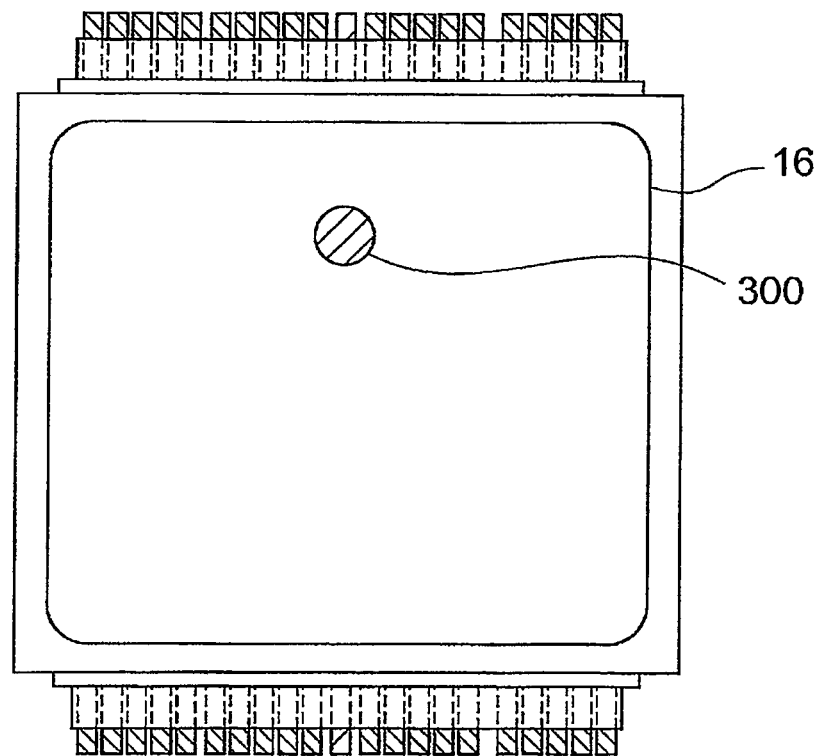
FIG. 19 is a plan view of a flat battery according to Comparative Example 2.

Flat battery samples were produced as shown in FIGS. 18 and 19. In the present example, negative electrode tab 15 was divided into four negative electrode tab parts 15a, 15b, 15c and 15d. Negative electrode tab parts 15a, 15b, 15c and 15d were joined to negative electrode collectors 131a, 131b, 131c and 131d, respectively, by ultrasonic welding. The negative electrode tab structure of FIG. 14 was applied to negative electrode tab part 15b so that negative electrode tab part 15b had conducting portion 151 with five conductors and different type of conducting portion 156.

Different type of conducting portion 156 was formed as a conductor of Constantan, whereas the conductors of conducting portion 151 were formed of copper. Negative electrode tab part 15b was completed by covering the conductors of conducting portion 151 and different type of conducting portion 156 with a resin material. A protection tape was applied to cover the part of contact with electrolyte in the vicinity of the weld joint of the conductor of different type of conducting portion 156 and the weld joint of one of the conductors of conducting portion 151 adjacent to different type of conducting portion 156.

On the positive electrode side, there was provided three positive electrode collectors. The positive electrode tab was divided into three positive electrode tab parts so that the positive electrode tab parts were welded to the positive electrode collectors, respectively. The joint structure of the positive electrode side was similar to that of the negative electrode side, except that different type of conducting portion 156 was not provided in the positive electrode tab.

The thus-obtained power generating element was packed in aluminum package members 16 and 17. The inner space formed by package members 16 and 17 was filled with electrolyte. In this way, the sample of flat battery 1 was obtained.

Figure 20:
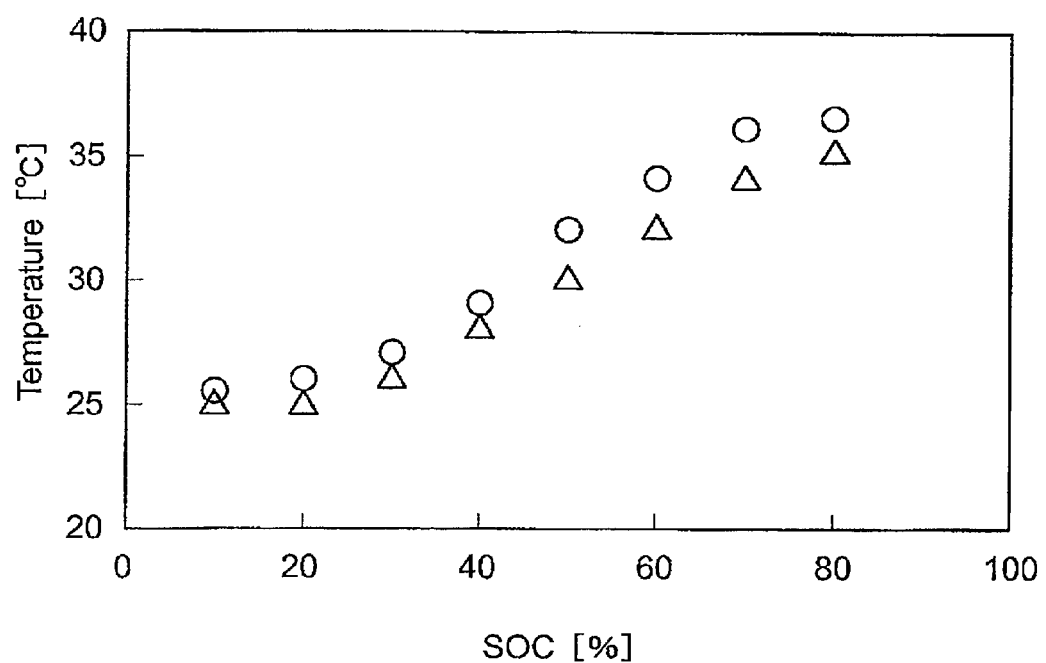
FIG. 20 is a graph showing the temperature characteristics, with respect to SOC, of the flat batteries according to Example 3 and Comparative Example 2.

The sample was tested by the following test method. With the supply of a stationary charging current, flat battery 1 was charged to increase the state of charge (SOC) of flat battery from 10% to 80%. During the change of the SOC from 10% to 80%, the inside temperature of the battery was measured in SOC increments of 10%. The battery inside temperature was herein determined, upon detection of a potential difference between conducting portion 151 and different type of conducting portion 156 by a voltage sensor, according to the detection voltage of the sensor and the Peltier coefficient based on the metals contained in the conductors of conducting portion 151 and different type of conducting portion 156. The test results are indicated in FIG. 20.

Comparative Example 2

As a comparative example to Example 3, the flat battery sample was produced in the same manner as in Example 3, except for using a conductor of conducting portion 151 in place of a conductor of different type of conducting portion 156.

As shown in FIG. 19, thermocouple 300 was adhered to package member 16 so as to measure the outside temperature of the battery. By charging the battery to increase the SOC from 10% to 80% with the supply of a stationary charging current, the battery outside temperature was measured in SOC increments of 10% during the change of the SOC from 10% to 80% in the same manner as in Example 3. The test results are indicated in FIG. 20.

FIG. 20 is a graph showing the temperature characteristics, with respect to the SOC, of the flat batteries of Example 3 and Comparative Example 2. In FIG. 20, the lateral axis represents the SOC; the vertical axis represents the battery temperature; the test results of Examples 3 are indicated by circle plots; and the test results of Comparative Example 2 are indicated by triangle plots. As the charging of the battery was performed with the supply of the stationary current as mentioned above, the SOC was increased in proportion to time. It can be thus regarded that the lateral axis represents the time in FIG. 20.

As is seen from the test results of FIG. 20, the temperature rise time was earlier in Example 3 then in Comparative Example 2. The reason for this is assumed that, in Comparative Example 2, the temperature of power generating element 18 was detected indirectly via package member 16 so that the temperature rise was slow.

At the time the SOC reached 80%, there was a difference between the detection temperatures of Example 3 and Comparative Example 2 as shown in FIG. 20. However, the detection temperature of Comparative Example 2 became 37° C., that is, the same as the detection temperature of Example 3 after a lapse of 5 minutes in the state where the SOC was 80%. It was confirmed from these results that the response to the temperature of flat battery 1 was faster in Example 3.

The invention claimed is:

1. A flat battery, comprising:
a power generating element accommodated in an inner space formed by sealing outer peripheral edges of package members;
a collector connected to an electrode plate of the power generating element; and
an electrode tab taken out from the outer peripheral edges of the package members,
wherein the electrode tab includes a conducting portion and a stress relieving portion,
wherein the conducting portion has a plurality of conductors of the same polarity being joined to the same collector and extending in parallel to each other from the same collector toward the outer peripheral edges of the package members for power output from the power generating element, and
wherein the stress relieving portion is formed of a material having higher elasticity than that of the conducting portion and arranged between adjacent conductors of the plurality of conductors of the same polarity.

2. The flat battery according to claim 1, wherein the electrode tab has a different type of conducting portion formed of a different material from that of the conducting portion so as to extend in parallel to the conductors and serve as a point of contact to a sensor for detecting a temperature of the inner space; and wherein the stress relieving portion is adapted to keep the conducting portion and the different type of conducting portion insulated from each other.

3. The flat battery according to claim 1, wherein a cut is formed in the stress relieving portion so as to extend from the collector to the outer peripheral edges of the package members.

4. The flat battery according to claim 1, wherein recesses are formed in the stress relieving portion at positions between the plurality of conductors.

5. The flat battery according to claim 1, wherein a plurality of collectors are laminated within the inner space; wherein the electrode tab has a plurality of conducting portions to one of which any one of the collectors is joined and to the other of which another one of the collectors is joined.

6. The flat battery according to claim 5, wherein the stress relieving portion is arranged between the one of the conducting portions and the other of the conducting portions; and wherein a cut is formed in the stress relieving portion.

7. The flat battery according to claim 1, wherein a plurality of collectors are laminated within the inner space; and the electrode tab has a plurality of conducting portions to which the plurality of collectors are joined, respectively.

8. The flat battery according to claim 5, wherein the stress relieving portion is adapted to keep the plurality of conducting portions insulated from each other.

9. The flat battery according to claim 7, wherein the stress relieving portion is adapted to keep the plurality of conducting portions insulated from each other.

10. The flat battery according to claim 3, wherein a width of the cut is greater than or equal to one-half of a distance between the conductors and smaller than a length of the conductors in a width direction of the conducting portion.

11. The flat battery according to claim 4, wherein a length of the recesses in an axial direction of the conducting portion is greater than or equal to one-half of a length of the conductors in the axial direction and smaller than a length of the stress relieving portion in the axial direction.

12. The flat battery according to claim 1,
wherein the flat battery comprises, as the collector, a positive electrode collector connected to a positive electrode plate of the power generating element, and a negative electrode collector connected to a negative electrode plate of the power generating element;
wherein the flat battery comprises a positive electrode tab and a negative electrode tab;
wherein the positive electrode tab includes: a conducting portion having a plurality of conductors joined to the same positive electrode collector and extending in parallel to each other toward an outer peripheral edge of the package members, and a stress relieving portion formed of a material having higher elasticity than that of the conducting portion and arranged between adjacent conductors of the plurality of conductors; and
wherein the negative electrode tab includes: a conducting portion having a plurality of conductors joined to the same negative electrode collector and extending in parallel to each other toward an outer peripheral edge of the package members, and a stress relieving portion formed of a material having a higher elasticity than that of the conducting portion and arranged between adjacent conductors of the plurality of conductors.

* * * * *